(12) United States Patent
Umeda

(10) Patent No.: US 8,045,795 B2
(45) Date of Patent: Oct. 25, 2011

(54) IMAGE PROCESSING APPARATUS, IMAGE PROCESSING METHOD, COMPUTER PROGRAM, AND STORAGE MEDIUM

(75) Inventor: Kiyoshi Umeda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 833 days.

(21) Appl. No.: 11/423,903

(22) Filed: Jun. 13, 2006

(65) Prior Publication Data

US 2006/0280362 A1 Dec. 14, 2006

(30) Foreign Application Priority Data

Jun. 14, 2005 (JP) ................................ 2005-174251

(51) Int. Cl.
*G06K 9/00* (2006.01)
(52) U.S. Cl. ........................................ 382/167; 382/275
(58) Field of Classification Search .................. 382/275, 382/117, 167, 162–163; 358/518, 528
See application file for complete search history.

(56) References Cited

U.S. PATENT DOCUMENTS

| 6,151,403 | A | 11/2000 | Luo | |
| 6,252,976 | B1 | 6/2001 | Schildkraut | |
| 6,278,491 | B1 | 8/2001 | Wang | |
| 6,292,574 | B1 | 9/2001 | Schildkraut | |
| 6,631,208 | B1 * | 10/2003 | Kinjo et al. | 382/167 |
| 6,798,903 | B2 | 9/2004 | Takaoka | |
| 7,088,855 | B1 * | 8/2006 | Vide | 382/167 |
| 7,116,820 | B2 | 10/2006 | Luo | |
| 7,415,165 | B2 * | 8/2008 | Itagaki et al. | 382/282 |
| 2003/0142285 | A1 * | 7/2003 | Enomoto | 355/77 |
| 2003/0151674 | A1 * | 8/2003 | Lin | 348/222.1 |
| 2004/0228542 | A1 * | 11/2004 | Zhang et al. | 382/275 |
| 2005/0031224 | A1 | 2/2005 | Prilutsky et al. | |
| 2005/0232481 | A1 * | 10/2005 | Wu | 382/167 |

FOREIGN PATENT DOCUMENTS

| EP | 911759 A2 | 4/1999 |
| JP | 07-013274 A | 1/1995 |
| JP | 11-136498 A | 5/1999 |
| JP | 11-149559 A | 6/1999 |
| JP | 11-284874 A | 10/1999 |
| JP | 2000-125320 A | 4/2000 |
| JP | 2001-186325 A | 7/2001 |
| JP | 2004-326805 A | 11/2004 |

* cited by examiner

*Primary Examiner* — Samir Ahmed
*Assistant Examiner* — Ruiping Li
(74) *Attorney, Agent, or Firm* — Canon U.S.A., Inc., IP Division

(57) ABSTRACT

An image processing apparatus includes a calculating unit configured to calculate an evaluation amount of poor color tone for every pixel in an image and an extracting unit configured to extract a candidate pixel having the poor color tone on the basis of the evaluation amount. The evaluation amount is calculated from red and green components of the image.

22 Claims, 24 Drawing Sheets

FIG. 5A
FIG. 5B
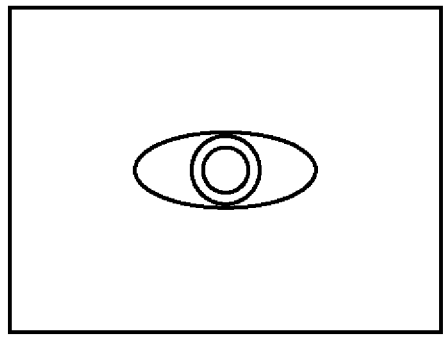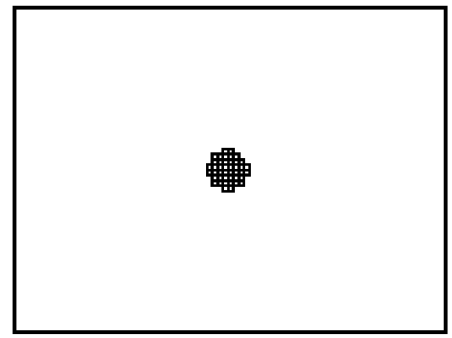
FIG. 6A
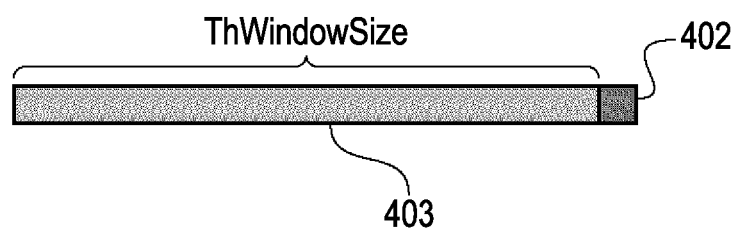
FIG. 6B
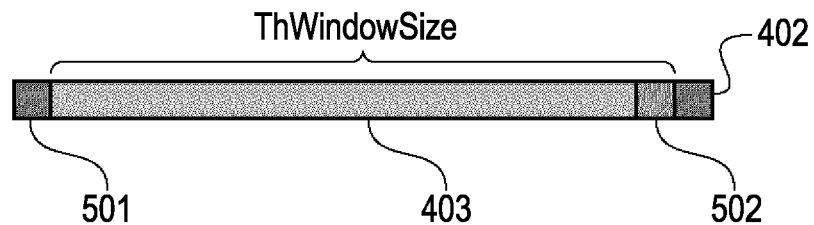

FIG. 9
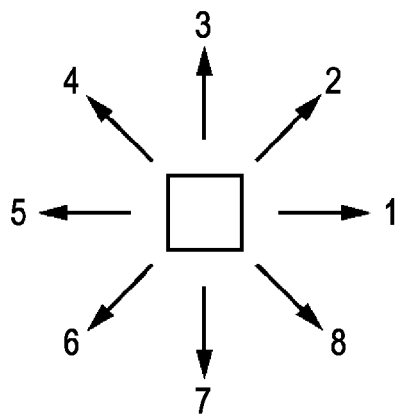
FIG. 10
| DIRECTION | 1 | 2 | 3 | 4 | 5 | 6 | 7 | 8 |
|---|---|---|---|---|---|---|---|---|
| FREQUENCY | 1 | 1 | 2 | 1 | 0 | 2 | 1 | 1 |
FIG. 11
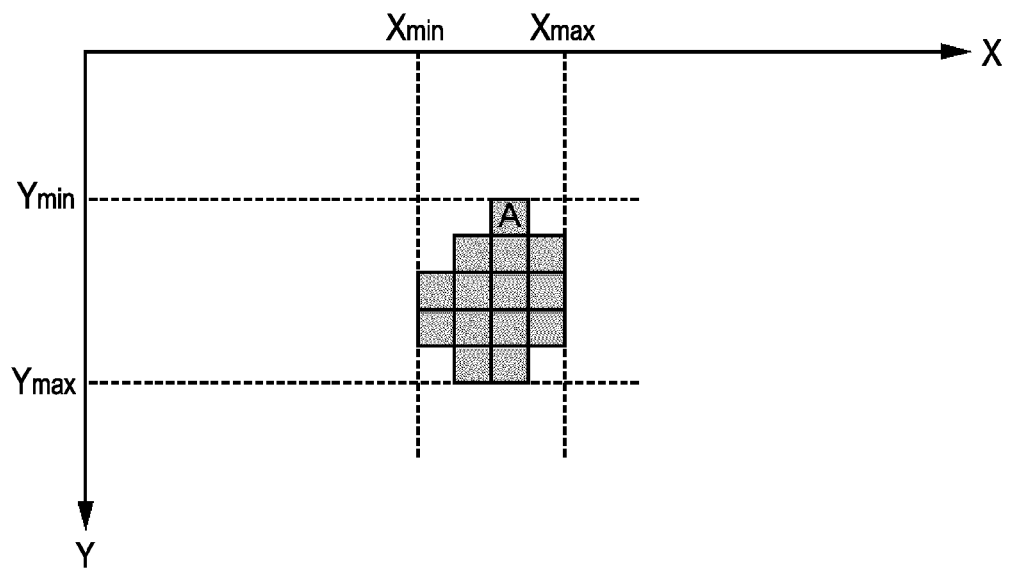

FIG. 31
| INDEX | COORDINATE OF UPPER LEFT CORNER | | COORDINATE OF LOWER RIGHT CORNER | |
|---|---|---|---|---|
| | x | y | x | y |
| 0 | 50 | 30 | 55 | 35 |
| 1 | 100 | 30 | 105 | 35 |
| 2 | 80 | 205 | 90 | 210 |
| 3 | 130 | 205 | 140 | 210 |
FIG. 32A
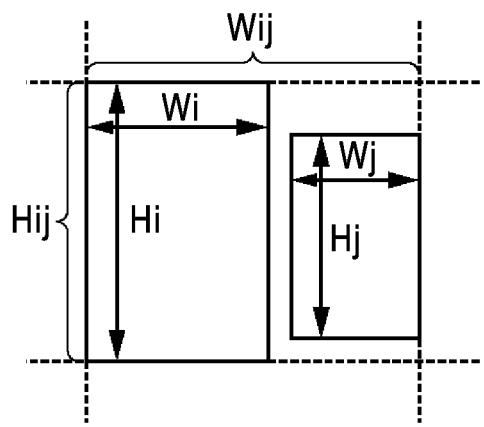
FIG. 32B
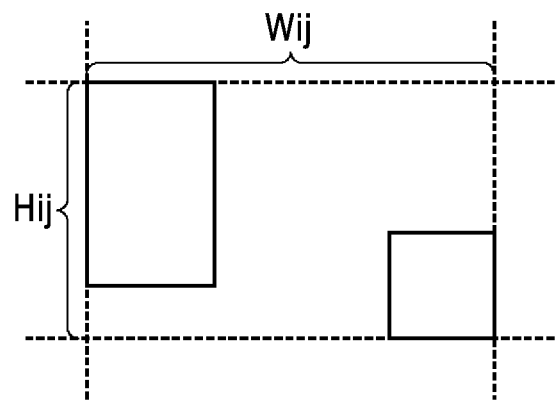

FIG. 38

| INDEX | COORDINATE OF UPPER LEFT CORNER | | COORDINATE OF LOWER RIGHT CORNER | | MAXIMUM LUMINANCE $Y_{max}$ | MAXIMUM VALUE OF EVALUATION AMOUNT $E_{rmax}$ |
|---|---|---|---|---|---|---|
| | x | y | x | y | | |
| 0 | 50 | 30 | 55 | 35 | 228 | 96 |
| 1 | 100 | 30 | 105 | 35 | 208 | 89 |
| 2 | 80 | 205 | 90 | 210 | 198 | 92 |
| 3 | 130 | 205 | 140 | 210 | 212 | 87 |

IMAGE PROCESSING APPARATUS, IMAGE PROCESSING METHOD, COMPUTER PROGRAM, AND STORAGE MEDIUM

CROSS REFERENCE TO RELATED APPLICATIONS

This application is related to co-pending application Ser. No. 11/423,898 filed on Jun. 13, 2006.

BACKGROUND OF THE INVENTION

1. Field of the Invention

The present invention relates to an image processing apparatus and an image processing method. For example, the present invention relates to image processing for detection of an image area having poor color tone of an eye (red-eye).

2. Description of the Related Art

It is well known that flash photography can cause poor color tone of an eye, which is widely known as the red eye effect. The red eye effect is a phenomenon caused by light that is emitted from a flash and incident on an open pupil and that illuminates the retina at the interior back of the eye. The light reflected from the back of the retina brings the red of the capillary blood vessels into an image of a human being or an animal, such as a dog or a cat, captured by using the flash under poorly illuminated conditions. It is likely to cause the red eye effect in the case of persons having the eyes of lighter pigment because the transmittance of the pupil, that is, the crystalline lens is increased as the pigment becomes lighter.

Digital cameras, which have become popular recently, have been increasingly reduced in size, and the optical axes of the lenses tend to be close to the positions of the light sources of flashes in such digital cameras. The red eye effect is generally likely to occur as the positions of the light sources of the flashes become closer to the optical axes of the lenses. This is an important challenge.

In a known method of preventing the red eye effect, an image is captured with the pupil of a subject being closed by emitting a preflash. However, this method undesirably increases the power consumption of a battery, compared with normal image capturing, and the preflash can damage the facial expression of the subject.

Accordingly, many methods of correcting and processing digital image data captured by a digital camera by using a personal computer etc. to reduce the red eye effect have been developed in recent years.

The methods of reducing the red eye effect on digital image data are roughly divided into manual correction, semi-automatic correction, and automatic correction.

In the manual correction, a user uses a mouse, a pointing device including a stylus and a tablet, or a touch panel to specify a red eye area displayed in a display and removes the red eye.

In the semi-automatic correction, a user specifies an area including a red eye to determine a correction range of the red eye from the specified information and removes the red eye. For example, a user specifies an area around both eyes or specifies one point near the eyes with a pointing device. The user determines a correction range from information concerning the specified area or point to remove the red eye.

In the automatic correction, a digital camera automatically detects a correction range of a red eye from digital image data without requiring a special operation by a user, and performs correction of the red eye.

It is necessary for a user to specify a correction point by performing any operation in the manual and semi-automatic corrections. Accordingly, the user is required to perform a complicated operation in which a correction area is specified after enlarging and displaying a neighborhood of an area to be corrected in the image data. Although such an operation is relatively easily performed in, for example, a personal computer system provided with a large display device, it is not easy to perform the operation of enlarging an image and scrolling the enlarged image to specify a correction area in an apparatus, such as a digital camera or a printer, provided with a small area display device.

Various approaches to the automatic correction of the red eye effect, which requires no complicated operation of users and which is effective for apparatuses without larger display devices, have been discussed in recent years.

For example, Japanese Patent Laid-Open No. 11-136498 discloses a method of detecting a flesh-colored area from an image, searching for pixels supposed to include a red eye in the detected area, and correcting the pixels including the red eye. Japanese Patent Laid-Open No. 11-149559 discloses a method of detecting a flesh-colored area, detecting first and second valley areas having lower luminances corresponding to the luminances of the pupils in the detected area, and determining an eye on the basis of the distance between the first and second valley areas. Japanese Patent Laid-Open No. 2000-125320 discloses a method of detecting a flesh-colored area to determine whether the detected flesh-colored area represents a feature of a human being, and detecting a pair of red eye defects in the area and measuring a distance between the red eye defects and a size of the red eye defects to determine the red eye area. Japanese Patent Laid-Open No. 11-284874 discloses a method of automatically detecting whether an image includes a red pupil and, if a red pupil is detected, measuring the position and size of the red pupil to automatically convert red pixels in the image of the pupil into a predetermined color.

However, the proposed methods of automatically correcting the red eye effect have the following problems.

Although the detection of the red eye area on the basis of the detection of the flesh-colored area of a human being or on the basis of a result of the detection of a face by using, for example, a neural network provides higher reliability, it is necessary to refer to a wider area in the image, thus requiring a large memory and a larger amount of calculation. Accordingly, it is difficult to employ such a detection method in a system built in a digital camera or a printer, although the method is suitable for processing in a personal computer including a high-performance CPU operating at a clock rate of several gigahertz and having a memory capacity of several hundred megabytes.

Many methods that have been proposed, in addition to the above examples relating to the automatic correction, use a feature in which the red eye area has a higher saturation than that of a surrounding area to determine the red eye area. However, the determination on the basis of the saturation is not necessarily suitable for persons having the eyes of darker pigment. As widely known, a saturation S is calculated according to Equation (1) where pixel values are given in an RGB (red, green, and blue) system:

[Formula 1]

$$S = \{\max(R,G,B) - \min(R,G,B)\}/\max(R,G,B) \quad (1)$$

where "max(R,G,B)" denotes a maximum value of an RGB component and "min(R,G,B)" denotes a minimum value of the RGB component.

For example, experiments show that the flesh-colored areas of Japanese are concentrated on around 0 to 30 degrees in a hue (0 to 359 degrees). In an HIS (hue, intensity, and saturation) system, a hue angle of around zero represents a red and the hue is approximated to yellow as the hue angle increases. The RGB values have a relationship shown in Expression (2) at the hue angles of 0 to 30 degrees.

[Formula 2]

$$R>G>B \qquad (2)$$

As described above, it is unlikely to cause a bright red eye in the case of persons having the eyes of darker pigment, compared with those having the eyes of lighter pigment.

Japanese have the following estimated pixel values in the red eye area and the flesh-colored area around the eye in view of the above description:

Red Eye Area: (R,G,B)=(109,58,65)
Flesh-colored Area: (R,G,B)=(226,183,128)

In this case, the saturation of the red eye area is equal to "40" and the saturation of the flesh-colored area is equal to "43", which is approximately the same value as in the red eye area. In other words, it may be impossible to determine the pixels corresponding to the red eye area depending on subjects even in view of the saturation.

SUMMARY OF THE INVENTION

It is desirable to accurately detect an image area having poor color tone.

According to an embodiment of the present invention, an image processing apparatus includes a calculating unit configured to calculate an evaluation amount of poor color tone for every pixel in an image, and an extracting unit configured to extract a candidate pixel having the poor color tone on the basis of the evaluation amount. The evaluation amount is calculated from red and green components of the image.

According to another embodiment of the present invention, an image processing method includes the steps of calculating an evaluation amount of poor color tone for every pixel in an image and extracting a candidate pixel having the poor color tone on the basis of the evaluation amount. The evaluation amount is calculated from red and green components of the image.

According to still another embodiment of the present invention, an image processing apparatus detecting an image area having poor color tone of an eye includes a calculating unit configured to calculate an evaluation amount of the poor color tone on the basis of a predetermined color component for every pixel of an input image; a pixel extracting unit configured to extract a candidate pixel in the image area having the poor color tone on the basis of the evaluation amount; an area extracting unit configured to extract a candidate area having a predetermined shape, including the candidate pixel; and a determining unit configured to determine whether the candidate area is used as a correction area on the basis of a characteristic amount of the eye, calculated from the candidate area.

According to yet another embodiment of the present invention, an image processing apparatus includes a calculating unit configured to calculate an evaluation amount of poor color tone for every pixel in an image and an extracting unit configured to extract a candidate pixel having the poor color tone on the basis of the evaluation amount. A weight smaller than the weights of red and green components of the image is applied to a blue component of the image, and the evaluation amount is calculated from the red and green components and the blue component having the weight applied thereto of the image.

According to still a further embodiment of the present invention, an image processing method of detecting an image area having poor color tone of an eye includes the steps of calculating an evaluation amount of the poor color tone on the basis of a predetermined color component for every pixel of an input image; extracting a candidate pixel in the image area having the poor color tone on the basis of the evaluation amount; extracting a candidate area having a predetermined shape, including the candidate pixel; and determining whether the candidate area is used as a correction area on the basis of a characteristic amount of the eye, calculated from the candidate area.

According to yet a further embodiment of the present invention, an image processing method includes the steps of calculating an evaluation amount of poor color tone for every pixel in an image and extracting a candidate pixel having the poor color tone on the basis of the evaluation amount. A weight smaller than the weights of red and green components of the image is applied to a blue component of the image, and the evaluation amount is calculated from the red and green components and the blue component having the weight applied thereto of the image.

Furthermore, according to another embodiment of the present invention, a program controls an image processing apparatus so as to realize the image processing method.

Finally, according to another embodiment of the present invention, a recording medium has the program recorded therein.

According to the present invention, an image area having poor color tone can be accurately detected. Accordingly, it is possible to appropriately detect an image area (an area to be corrected) having poor color tone of an eye, independently of whether the person has darker or lighter pigment.

Further features of the present invention will become apparent from the following description of exemplary embodiments with reference to the attached drawings.

BRIEF DESCRIPTION OF THE DRAWINGS

The accompany drawings, which are incorporated in and constitute a part of the specification, illustrate embodiments of the present invention and, together with the description, serve to explain the principles of the invention.

FIGS. 5A and 5B show an example of the adaptive binarization.

FIGS. 6A and 6B illustrate a high-speed technique used for calculating an average.

FIG. 9 shows directions in a directional histogram.

FIG. 10 shows an example of the directional histogram.

FIG. 11 shows a circumscribed rectangular area of a red area.

FIG. 31 shows an example of the candidate area list.

FIGS. 32A and 32B illustrate a process of combining candidate areas into one.

FIG. 38 shows an example of the candidate area list.

DESCRIPTION OF THE EMBODIMENTS

Image processing according to embodiments of the present invention will be described in detail with reference to the attached drawings. It is desirable to include the image processing described below in a printer driver that generates image information to be output to a printer engine and that operates in a computer and in a scanner driver that drives an optical scanner and that operates in a computer. Alternatively, the image processing may be incorporated in hardware, such as a copier, a facsimile, a printer, a scanner, a multifunctional device, a digital camera, or a digital video camera, or may be supplied to the hardware as software.

First Embodiment

Structure

Figure 1:
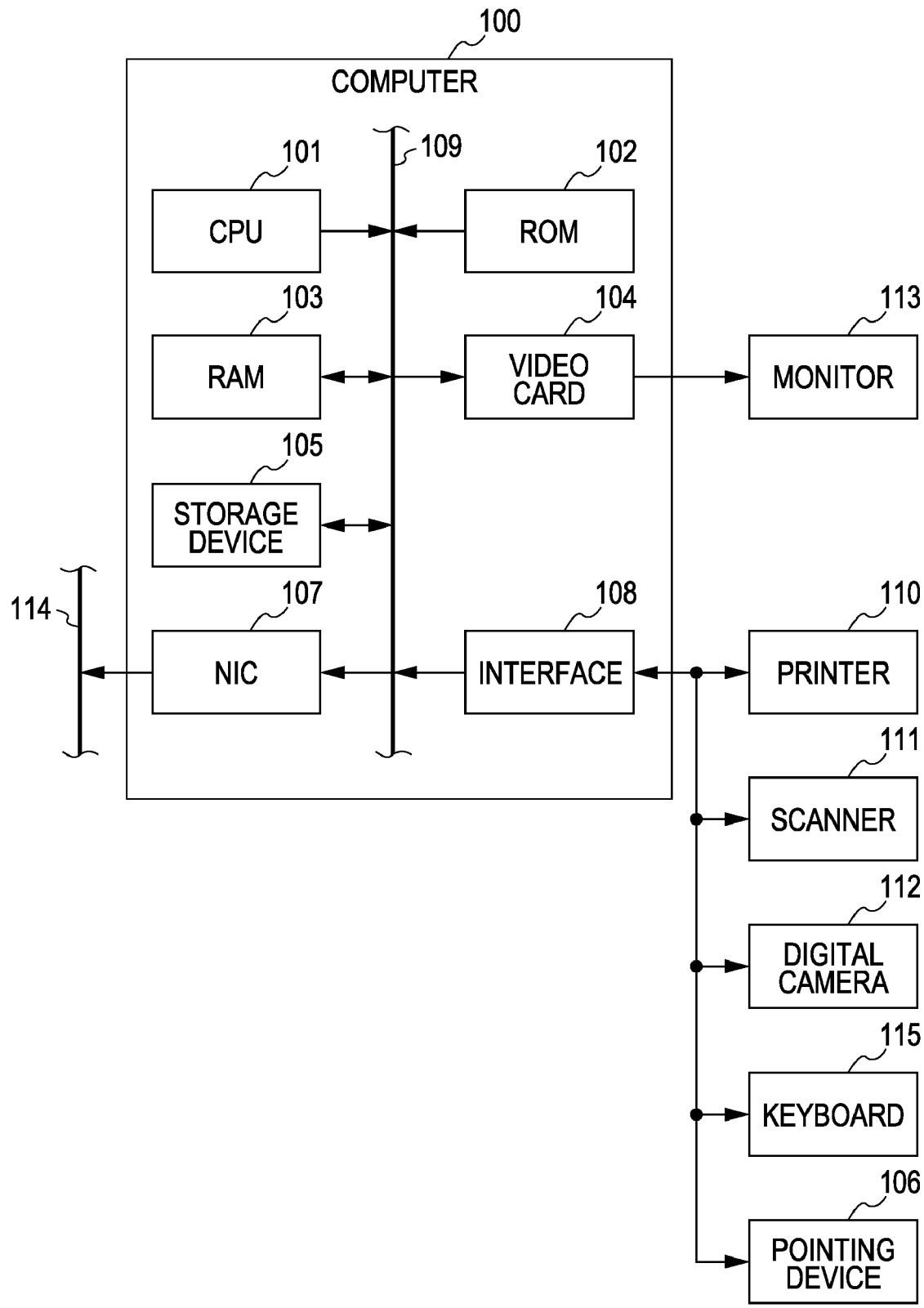
FIG. 1 is a block diagram showing an example of the structure of a computer (an image processing apparatus) performing image processing according to a first embodiment of the present invention.

FIG. 1 is a block diagram showing an example of the structure of a computer (an image processing apparatus) performing the image processing according to a first embodiment of the present invention.

A computer 100 includes a central processing unit (CPU) 101, a read only memory (ROM) 102, a random access memory (RAM) 103, a video card 104 connected to a monitor 113 (the monitor 113 may include a touch panel), a storage device 105, such as a hard disk drive or a memory card, a serial bus interface 108 conforming to universal serial bus (USB) or IEEE 1394, and a network interface card (NIC) 107 connected to a network 114. The above components are connected to each other via a system bus 109. A pointing device 106, such as a mouse, a stylus, or a tablet, a keyboard 115, and so on are connected to the interface 108. A printer 110, a scanner 111, a digital camera 112, etc. may be connected to the interface 108.

The CPU 101 can load programs (including programs for image processing described below) stored in the ROM 102 or the storage device 105 into the RAM 103, serving as a working memory, and can execute the programs. The CPU 101 controls the above components via the system bus 109 in accordance with the programs to realize the functions of the programs.

FIG. 1 shows a common structure of the hardware performing the image processing according to the first embodiment of the present invention. The present invention is applicable to a structure that does not include some of the above components or to a structure to which other components are added.

Summary of Process

Figure 2:
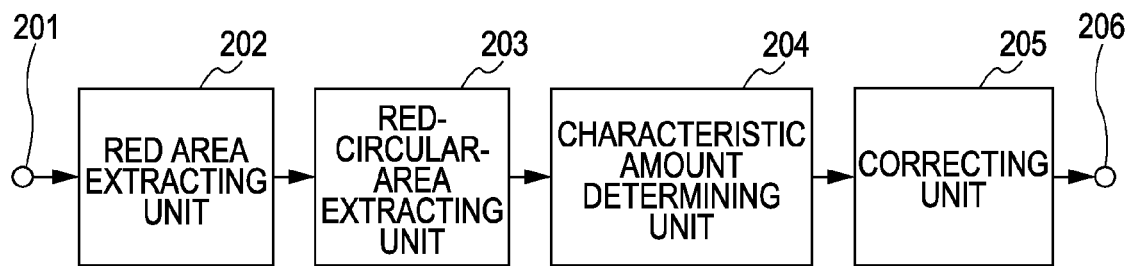
FIG. 2 is a functional block diagram showing the summary of a process of automatically correcting a red eye, according to the first embodiment of the present invention.

FIG. 2 is a functional block diagram showing the summary of a process of automatically correcting a red eye, according to the first embodiment of the present invention. The process is performed by the CPU 101. The process receives digital image data from, for example, the digital camera 112 or the scanner 111. The digital image data has 24 bits per pixel including the R, G, and B components each having eight bits.

Figure 3:
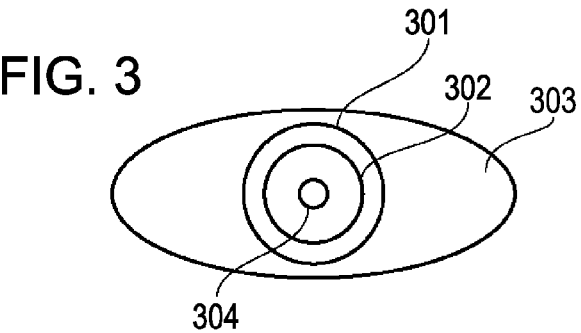
FIG. 3 schematically shows an image of a red eye, captured by an imaging apparatus, such as a digital camera.

FIG. 3 schematically shows an image of a red eye, captured by an imaging apparatus, such as the digital camera 112. Reference numeral 302 denotes the pupil area of an eye, reference numeral 301 denotes the iris area thereof, and reference numeral 304 denotes a highlight area caused by a flash used in capture of the image. Reference numeral 303 denotes the white area of the eye. Ordinarily, the pupil area 302 becomes red in an image due to the red eye effect.

Referring back to FIG. 2, a red area extracting unit 202 extracts a red area from image data input through an input terminal 201. A method of extracting the red area by adaptive binarization will be described below, although various methods of extracting the red area have been proposed. Since the red area extracting unit 202 extracts the red areas regardless of whether the red areas are included in an eye, the extracted red areas correspond to the red eye, a red traffic light, a red pattern in clothes, a red illumination, and so on.

A red-circular-area extracting unit 203 receives the input image data and information concerning the extracted red area to extract an area having a shape relatively close to a circle (hereinafter referred to as a red circular area) from the red area. A method of extracting the red circular area by border following will be described below, although various methods of determining the shape of an area have been proposed. The red-circular-area extracting unit 203 stores positional information concerning the extracted red circular area in a candidate area list.

A characteristic amount determining unit 204 receives the input image data and the candidate area list to determine various characteristic amounts used for determining an eye in the red circular area stored in the candidate area list. The characteristic amounts used for determining an eye include the saturation of the red circular area, the luminosity, the saturation, and the hue of an area around the red circular area, and the edge distribution in the area around the red circular area. These characteristic amounts or values are compared with predetermined threshold values to determine the red circular area satisfying all the conditions as a red eye area. The characteristic amount determining unit 204 stores positional information concerning the determined red eye area in a candidate area list.

A correcting unit 205 receives the input image data and the candidate area list having the positional information concerning the red eye area stored therein to correct the red eye area in the image data and to output the image data subjected to the correction through an output terminal 206. The image data after the correction is displayed in the monitor 113 or is stored in the RAM 103 or the storage device 105. Alternatively, the image data may be printed with the printer 110 connected to the interface 108 or may be transmitted via the NIC 107 to another computer or a server connected to the network 114 (including an intranet or the Internet).

Red Area Extracting Unit 202

The red area extracting unit 202 applies adaptive binarization to the input image data to extract the red area from the image data. Specifically, the red area extracting unit 202 calculates an evaluation amount indicating the level of red (hereinafter referred to as a red evaluation amount) for every pixel in the input image data, compares the red evaluation amount with a threshold value, and determines a target pixel as being red if the red evaluation amount is larger than the threshold value. This threshold value is adaptively determined in an area around the target pixel. In the "binarization" here, "one" is assigned to a pixel that is determined as being red and "zero" is assigned to a pixel that is not determined as being red.

Figure 4:
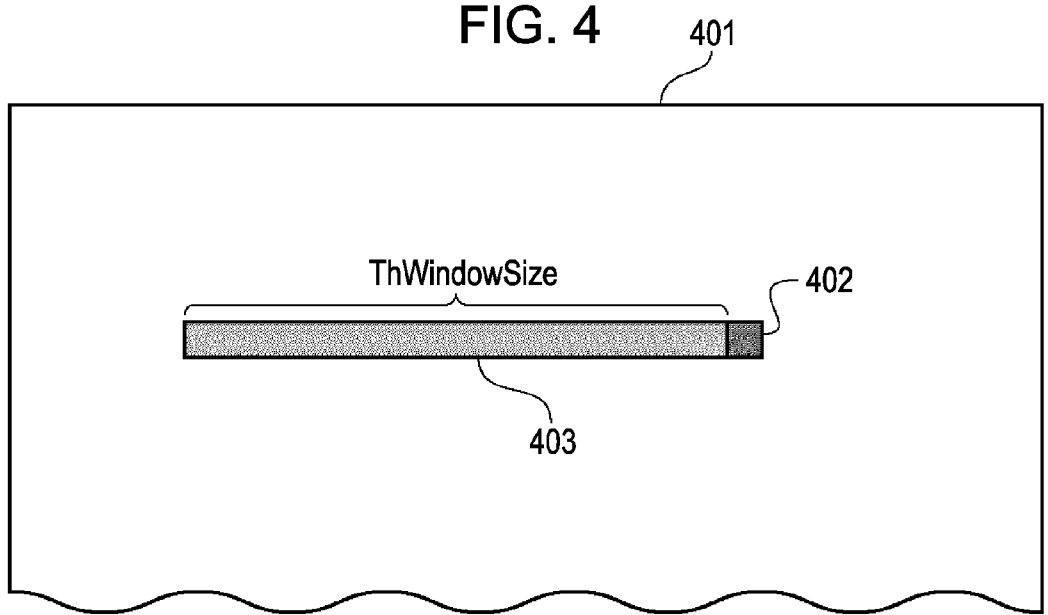
FIG. 4 illustrates adaptive binarization.

FIG. 4 illustrates the adaptive binarization.

A target pixel 402 in input image data 401 is subjected to the adaptive binarization. The red area extracting unit 202 calculates a red evaluation amount Er, indicating the level of red, of the target pixel 402 according to Equation (3):
[Formula 3]

$$Er=(R-G)/R \qquad (3)$$

Equation (3) means that the level of red of the target pixel 402 is calculated not from the saturation in the general HIS system but from the R and G components excluding the B component in the RGB system. The calculation of the red evaluation amount Er according to Equation (3), instead of the saturation, has the following advantages.

For example, a person having the eyes of darker pigment is unlikely to have bright red eyes because the person has a lower transmittance of the crystalline lens in the pupil area 302. As described above, experiments show that the red eye areas of Japanese have the estimated pixel values (R,G,B)= (109,58,65) and that the flesh-colored areas of Japanese are concentrated on red (zero degrees) to yellow (30 degrees) in the hue. The RGB components in these areas have the relationship R>G>B and the flesh-colored area around the eyes has the estimated pixel values (R,G,B)=(226,183,128). The B components have lower values both in the pixels in the red area and in the pixels in the flesh-colored area around the eyes. In such a case, the pixels in the red eye area have a saturation of 40 and the pixels in the flesh-colored area around the eyes have a saturation of 43, which is approximately the same as in the pixels in the red eye area. In other words, the saturation of the pixels in the red eye area is not prominent, compared with the saturation of the pixels in the flesh-colored area around the eyes. Accordingly, the use of the saturation as the threshold value for the adaptive binarization makes it difficult to detect the red eye area.

In contrast, when the red evaluation amount Er is calculated according to Equation (3), that is, on the basis of an evaluation amount that does not depend on the B component, the red evaluation amount Er of the pixels in the red eye area is equal to 51/109 or 47% and the red evaluation amount Er of the pixels in the flesh-colored area around the eyes is equal to 43/226 or 19%. Accordingly, the red evaluation amount Er of the pixels in the red eye area has a value two or more times larger than that of the pixels in the flesh-colored area around the eyes.

Consequently, when the red eye of a person having darker pigment in the eyes is to be detected, defining not the saturation but the evaluation amount that only includes the R and G components and excludes the B component, as in Equation (3), allows the pixels in the red eye area to be accurately extracted. Although the ratio of (R-G) to the R component is defined as the red evaluation amount Er in Equation (3), the red evaluation amount Er is not limited to this ratio. For example, only (R-G) or R/G may be defined as the red evaluation amount Er.

Also when the red eye of a person having lighter pigment in the eyes is to be detected, defining not the saturation but the evaluation amount that only includes the R and G components and excludes the B component, as in Equation (3), allows the pixels in the red eye area to be accurately extracted.

Referring back to FIG. 4, in order to binarize the target pixel 402, a window area 403 having the number of pixels denoted by "ThWindowSize" is set on the same line as the target pixel 402 and at the left of the target pixel 402 (ahead of the primary scanning direction) and an average Er(ave) of the red evaluation amounts Er of the pixels in the window area 403 is calculated. It is desirable that the number ThWindowSize of pixels be set to a value that is one to two percent of the short side of the image. Since the red evaluation amount Er is calculated only if the following conditions are satisfied, the red evaluation amount Er does not have a negative value.
[Formula 4]

$$R>0 \text{ and } R>G \qquad (4)$$

In order to perform the binarization of the target pixel 402 by using the average Er(ave), it is necessary for the target pixel 402 to satisfy the following conditions:
[Formula 5]

$$R>Th\_Rmin \text{ and } R>G \text{ and } R>B \qquad (5)$$

where "Th_Rmin" denotes a threshold value indicating the lower limit of the R component.

If the above conditions are satisfied, the binarization is performed according to Expression (6):
[Formula 6]

"1" is assigned if $Er>Er(ave)+Margin\_RGB$

"0" is assigned if $ER \leq Er(ave)+Margin\_RGB$  (6)

where "Margin_RGB" denotes a parameter.

According to Expression (6), if the red evaluation amount Er of the target pixel 402 is larger than a value given by adding Margin_RGB to the average Er(ave) of the red evaluation amounts Er in the window area 403, the binarized value of the target pixel 402 is set to "1", meaning that the target pixel 402 is extracted as the red area. Since the average Er(ave) becomes too large if the red areas continuously appear, an upper limit of the average Er(ave) may be set. The binarization result is stored in an area, different from the buffer for the input image data, in the RAM 103.

The above processing is performed to all the pixels for every line of the input image data while the target pixel 402 is shifted from left to right.

Although the threshold value for the binarization (the average Er(ave)) is calculated from the red evaluation amounts Er of the pixels in the window set in the same line as the target pixel 402 and at the left of the target pixel 402 in the first embodiment of the present invention, the window is not limited to the above one. For example, the window may be set in an area including several pixels at the left of the target pixel 402 (ahead of the primary scanning direction) across several lines above the line including the target pixel 402 (ahead of the secondary scanning direction) or may be set in a predetermined rectangular area around the target pixel 402.

FIGS. 5A and 5B show an example of the adaptive binarization. FIG. 5A shows an image around a red eye in the input image data. FIG. 5B is a binarized image resulting from the adaptive binarization. Only the pixels corresponding to the pupil of the red eye are extracted in FIG. 5B.

In order to calculate the average Er(ave) of the red evaluation amounts Er in the window set in the primary scanning direction, a high-speed technique described below may be used.

FIGS. 6A and 6B illustrate the high-speed technique used for calculating the average Er(ave).

Referring to FIG. 6A, in the calculation of the average Er(ave) of the red evaluation amounts Er in the window area 403 set at the left of the target pixel 402, the sum of the red evaluation amounts Er in the window area 403 is stored in a memory, such as the RAM 103. The average Er(ave) is simply calculated by dividing the sum by the number n of pixels in the window area 403. Then, the target pixel 402 is shifted to right by one pixel and the window area 403 is also shifted to right by one pixel. The sum of the red evaluation amounts Er in the window area 403 in FIG. 6B is yielded by subtracting the red evaluation amount Er of a pixel 501 from the sum calculated in FIG. 6A and, then, adding the red evaluation amount Er of a pixel 502 (a pixel proximate to the target pixel 402) to the subtraction result, so that the processing is performed at high-speed. In other words, there is no need to calculate again the red evaluation amounts Er of all the pixels in the window area 403 after shifting the target pixel 402 and the window area 403.

Red-Circular-Area Extracting Unit 203

The red-circular-area extracting unit 203 extracts the red circular area by the border following, which is a method for the binarization image processing.

Figure 7:
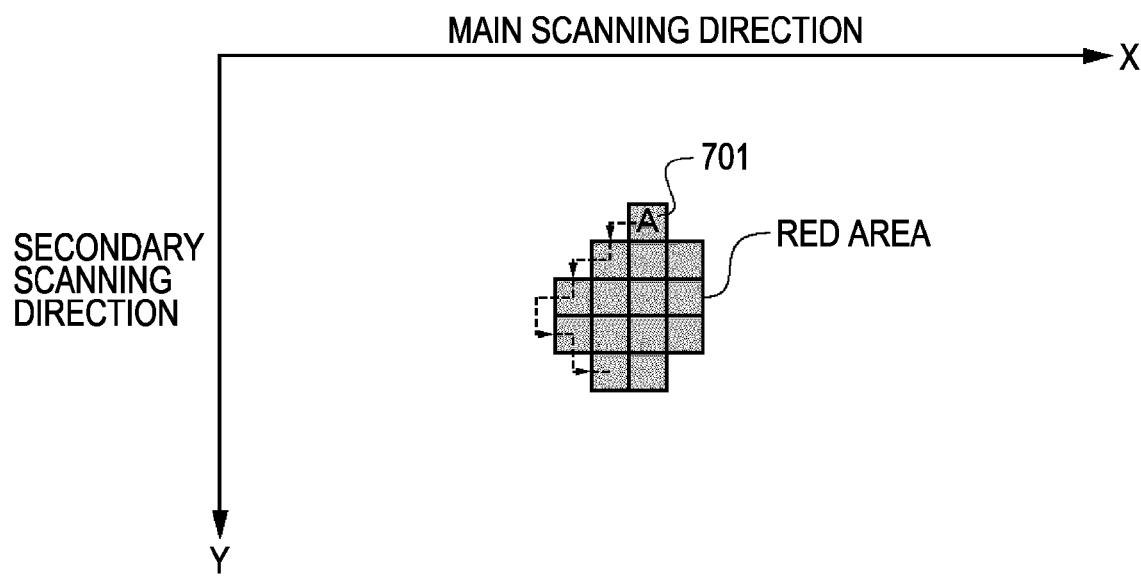
FIG. 7 illustrates border following.

FIG. 7 illustrates the border following.

In the border following, the binarized image resulting from the adaptive binarization is scanned in the primary scanning direction from the upper limit to set a target pixel (xa,ya) which has a value "1" and four pixels around which have a value "0" as a starting point. The four pixels include a pixel (xa−1,ya) at the left of the target pixel, a pixel (xa−1,ya−1) at the upper left of the target pixel, a pixel (xa,ya−1) above the target pixel, and a pixel (xa+1,ya−1) at the upper right of the target pixel. A pixel 701 in FIG. 7 is set as the starting point. A coordinate system whose origin is set to the upper left corner of the binarized image is set in FIG. 7.

Figure 8:
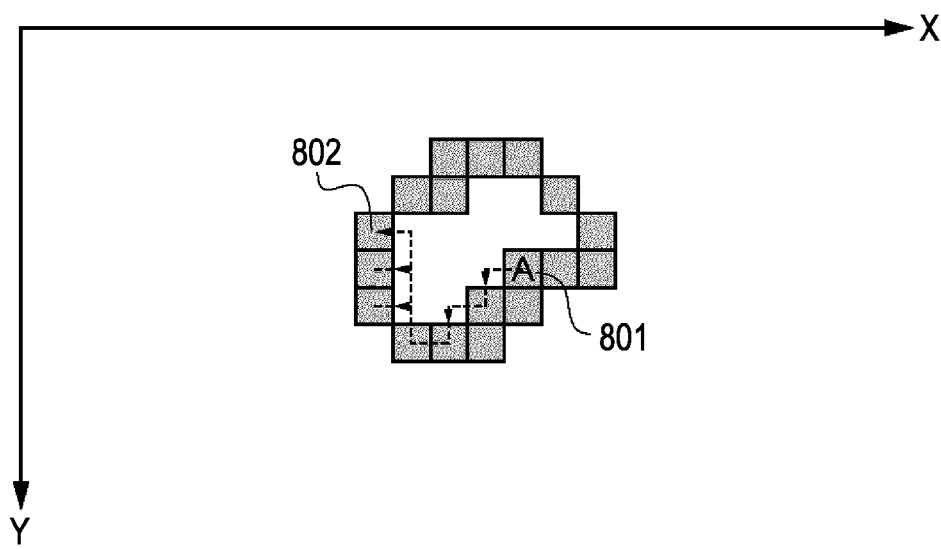
FIG. 8 illustrates the border following.

The pixels having the value "1" are followed counterclockwise from the starting-point pixel 701 around the read area back to the starting-point pixel 701. If the target pixel tracks outside the image area, or the Y coordinate of the target pixel is smaller than that of the pixel 701 set as the staring point during the border following process, the border following is stopped and a subsequent staring point is searched for. The border following is stopped if the Y coordinate of the target pixel is smaller than that of the pixel 701 during the border following in order to prevent improper tracing along the inner side of a circular area shown in FIG. 8. Since the Y coordinate of a pixel 802 is smaller than that of a starting-point pixel 801 if the inner side of the circular area is traced, the border following is stopped at the pixel 802.

In the border following process, it is possible to determine the circumferential length of the area to be subjected to the border following, a directional histogram, and the maximum and minimum values of the X and Y coordinates. The circumferential length is represented by the number of traced pixels. For example, the circumferential length corresponds to nine pixels including the starting-point pixel 701 in the example in FIG. 7.

The directional histogram is produced by accumulating the direction from one pixel to the subsequent pixel for every eight directions shown in FIG. 9. In the example in FIG. 7, the direction of the tracing is "667812334" and a direction histogram shown in FIG. 10 is produced if the border following is performed counterclockwise from the starting-point pixel 701.

The maximum and minimum values of the X and Y coordinates form a rectangular area circumscribing the area including the pixels having the value "1", that is, the red area, as shown in FIG. 11.

The red-circular-area extracting unit 203 applies the border following to the red area to yield the above values and determines whether the traced area is a red circular area.

Figure 12:
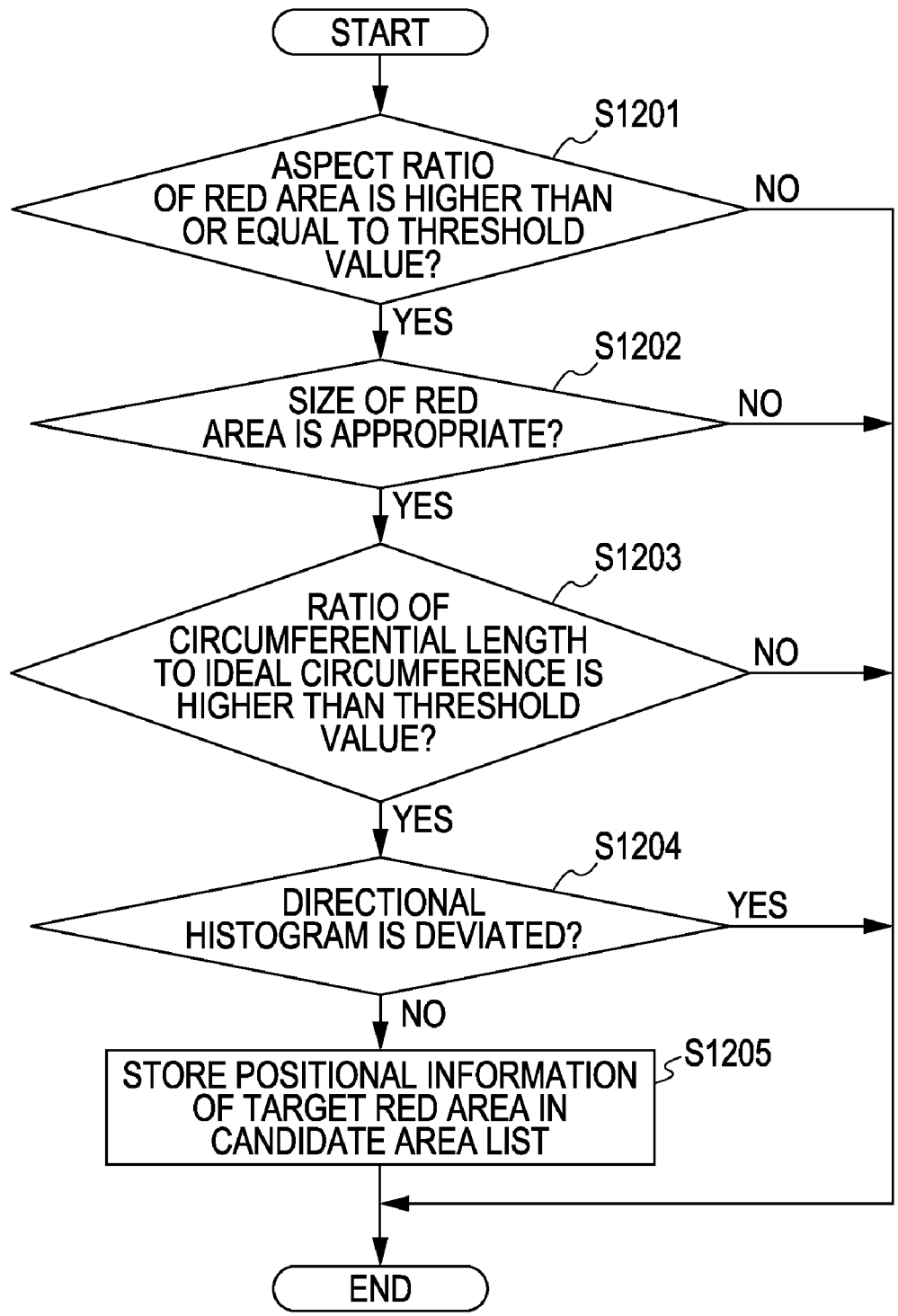
FIG. 12 is a flowchart showing an example of a process of determining whether a traced area is a red circular area.

FIG. 12 is a flowchart showing an example of a process of determining whether the traced area is a red circular area.

In Step S1201, the process determines whether the aspect ratio of the red area is larger than or equal to a predetermined threshold value Th_BF_VHRatio. The aspect ratio AR is calculated according to Equation (7):

[Formula 7]

$$AR=(y\max-y\min)/(x\max-x\min) \quad (7)$$

If AR>1, the reciprocal of the value is taken to be the aspect ratio, such that it always has a value between 0 and 1.

Specifically, the aspect ratio AR has a value from 0.0 to 1.0, and the longitudinal length is equal to the lateral length if AR=1.0. The process compares the aspect ratio AR with the threshold value Th_BF_VHRatio in Step S1201 and, if the AR<Th_BF_VHRatio, determines that the red area is not the red circular area to proceed to the subsequent red area.

If the process determines that AR≧Th_BF_VHRatio, then in Step S1202, the process determines whether the size of the red area is appropriate. The determination of whether the size is appropriate is performed on the basis of two points: (1) the upper and lower limits of the actual number of pixels and (2) the ratio of the short side or long side of the red area to the short side or long side of the image.

As for (1), the smaller value among the lateral length X=xmax−xmin and the longitudinal length Y=ymax−ymin of the red area is compared with a predetermined threshold value to determine whether the lateral length X or the longitudinal length Y is between an upper limit Th_BF_SizeMax and a lower limit Th_BF_SizeMin. If the lateral length X or the longitudinal length Y is not between the upper limit Th_BF_

SizeMax and the lower limit Th_BF_SizeMin, the process determines that the red area is not a red circular area to proceed to the subsequent red area.

As for (2), the ratio is calculated according to Expression (8):

[Formula 8]

$$Th\_BF\_RatioMin < \min(X,Y)/\min(W,H) < Th\_BF\_RatioMax \qquad (8)$$

where X=xmax−xmin, Y=ymax−ymin, "W" denotes a width of the input image, and "H" denotes a height of the input image.

If the target red area does not satisfy Expression (8), the process determines that the red area is not a red circular area to proceed to the subsequent red area. Although the example of the comparison between the short sides is shown in Expression (8), the comparison between the long sides may be performed.

If the process determines in Step S1202 that the size of the red area is appropriate, then in Step S1203, the process compares the circumferential length of the red area with an ideal circumference to determine whether the extracted red area is approximated to a circle. An ideal circumference Ci is approximated according to Equation (9) by using the width X and the height Y of the red area.

[Formula 9]

$$Ci = (X+Y) \times 2 \times 2\pi/8 \qquad (9)$$

The circumference of an inscribed circle of a square is calculated on the assumption that the extracted red area is the square. In Equation (9), "(X+Y)×2" denotes the length of the four sides of the square including the red area and "2π/8" denotes a ratio of the length of the four sides of the square to the circumference of the inscribed circle of the square. The process compares the ideal circumference Ci with the circumferential length according to Expression (10) and, if the Expression (10) is not satisfied, the process determines that the red area is not a red circular area to proceed to the subsequent red area.

[Formula 10]

$$\min(Ci,Cx)/\max(Ci,Cx) > Th\_BF\_CircleRatio \qquad (10)$$

where "Cx" denotes a circumferential length of the red area.

If the circumferential length satisfies Expression (10), then in Step S1204, the process determines whether the directional histogram is deviated. As described above, the directional histogram shown in FIG. 10 is produced in the border following process. If the target area of the border following is approximated to a circle, the directional histogram in the eight directions, resulting from the border following, shows equal distribution. However, for example, if the target area has a slim shape, the directional histogram is deviated (unequal). For example, if the target area has a slim shape extending from the upper right to the lower right, the frequencies are concentrated on Directions 2 and 6 among the eight directions in FIG. 9 and Directions 4 and 8 have lower frequencies. Accordingly, if all the conditions in Expression (11) are satisfied, the process determines that the target red area is a red circular area. If any of the conditions in Expression (11) is not satisfied, the process determines that the red area is not a red circular area to proceed to the subsequent red area.

[Formula 11]

$$sum(f1,f2,f5,f6) < \Sigma f \times Th\_BF\_DirectRatio$$

$$sum(f2,f3,f6,f7) < \Sigma f \times Th\_BF\_DirectRatio$$

$$sum(f3,f4,f7,f8) < \Sigma f \times Th\_BF\_DirectRatio$$

$$sum(f4,f5,f8,f1) < \Sigma f \times Th\_BF\_DirectRatio \qquad (11)$$

where "fn" denotes the frequency of a direction n, "sum(fa,fb,fc,fd)" denotes the sum of the frequencies of the directions a, b, c, and d, and "Σf" denotes the sum of the frequencies.

If the sum of the frequencies in a certain direction is larger than a predetermined value in Expression (11), that is, if the directional histogram is deviated to the certain direction, the process determines that the target red area is not a red circular area. Since the accuracy of the determination is possibly decreased if the sum Σf of the frequencies is decreased in the determination according to Expression (11), the process may skip Step S1204 to proceed to Step S1205 if the sum Σf of the frequencies is smaller than a predetermined value.

The process determines that the red area satisfying all the determinations from Step S1201 to Step S1204 (if the process skips Step S1204, the red area satisfying the remaining determinations from Step S1201 to Step S1203) is a red circular area (a candidate for a red eye area) and, then in Step S1205, the process stores the positional information in the candidate area list in the RAM 103. The process repeats the border following and the process shown in FIG. 12 until the target red area reaches an area near the bottom right of the image data.

Characteristic Amount Determining Unit 204

The characteristic amount determining unit 204 calculates various characteristic amounts used for determining the red eye of a person from the extracted red circular area (the candidate for the red eye area) and compares the calculated characteristic amounts with predetermined threshold values to determine whether the red circular area is a red eye area.

Figure 16:
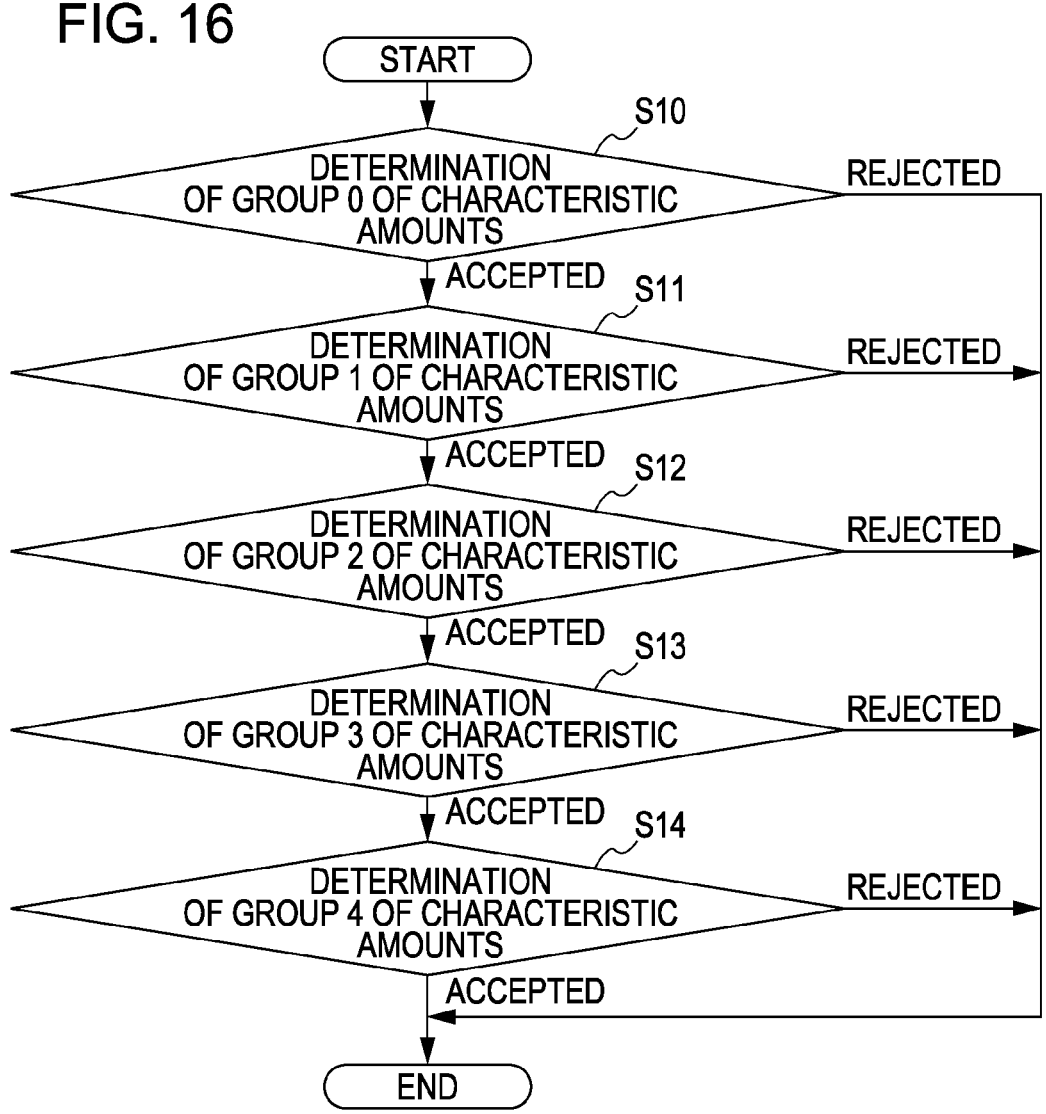
FIG. 16 is a flowchart showing an example of a process of determining groups of characteristic amounts.

The characteristic amount determining unit 204 performs the determination of the following five groups of characteristic amounts to the candidate for a red eye area recorded in the candidate area list in the previous processes, in the order shown in a flowchart in FIG. 16. Group 0 of characteristic amounts: comparison between the average Er(ave) of the evaluation amounts in the red circular area and the average Er(ave) of the evaluation amounts in an area around the red circular area (hereinafter referred to as a surrounding area) (Step S10)

Group 1 of characteristic amounts: determination of a variation in the hue, the red evaluation amount Er, and the color component in the red circular area (Step S11)

Group 2 of characteristic amounts: determination of the luminance in the surrounding area (Step S12)

Group 3 of characteristic amounts: determination of the saturation and the hue in the surrounding area (Step S13)

Group 4 of characteristic amounts: determination of the edge intensity in the surrounding area (Step S14)

An ideal red component of the red eye area is characterized by being within the surrounding pupil area. Experiments show that this characteristic is most prominent among other various characteristics. Accordingly, it is efficient to first perform the determination (Step S10) of Group 0 of characteristic amounts to narrow down the candidate for a red eye area.

The determination (Step S11) of Group 1 of characteristic amounts refers to only pixels in the candidate for a red eye area, so that the amount of calculation is small, compared with the determinations of the other groups of characteristic amounts.

The determinations (Step S12 and Step S13) of Group 2 of characteristic amounts and the Group 3 of characteristic amounts require conversion of the RGB components of the pixels in the surrounding area into the luminance and color difference components or conversion of the RGB components thereof into the luminosity, saturation, and hue components, so that the amount of calculation is larger than that in the determination of Group 1 of characteristic amounts.

The determination (Step S14) of Group 4 of characteristic amounts uses a known edge detection filter, such as Sobel filter, in order to yield the edge intensity. Accordingly, this determination has the largest amount of calculation among the determinations of the remaining groups of characteristic amounts.

Hence, the characteristic amount determining unit 204 sequentially performs the determinations from the determination having a smaller amount of calculation, or from the determination in which the characteristic of the red eye area can most easily be obtained. The characteristic amount determining unit 204 restrains the amount of processing by skipping the subsequent determinations, as shown in FIG. 16, if the characteristic amount determining unit 204 determines that the candidate for a red eye area is not a red eye area.

Definition of Surrounding Area

Figure 13A:
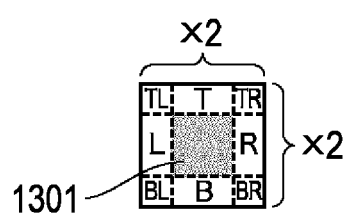
FIGS. 13A to 13C illustrate definition of surrounding areas used for calculating evaluation amounts of a candidate for a red eye area.
Figure 13B:
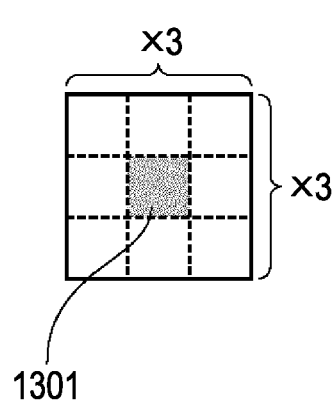
Figure 13C:
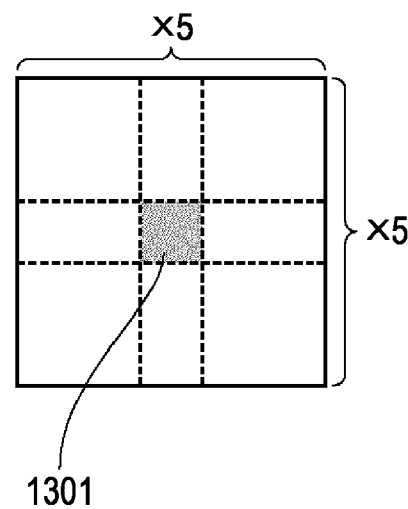

FIGS. 13A to 13C illustrate the definition of the surrounding areas used for calculating the characteristic amounts of the candidate for a red eye area.

Referring to FIGS. 13A to 13C, a central block 1301 is a circumscribed rectangle of the candidate for a red eye area (the red circular area) extracted in the previous processes. The surrounding area is an area around the block 1301, having longitudinal and lateral sizes two, three, or five times larger than those of the block 1301. The surrounding areas enlarged to two, three, and five times the size of the block 1301 are shown in FIGS. 13A to 13C. The "entire surrounding area" hereinafter means an area resulting from exclusion of the block 1301 from the surrounding area. The "block in the surrounding area" means each block given by extending the sides of the block 1301, as shown by broken lines in FIGS. 13A to 13C, and dividing the surrounding area into eight blocks. The determination is performed to this surrounding area in the case of the groups of the characteristic amount excluding Group 1 of characteristic amounts. Since the surrounding area is set to an area having a size up to five times of that of the circumscribed rectangle of the candidate for a red eye area, it is possible to perform the determination at high speed.

Figure 14A:
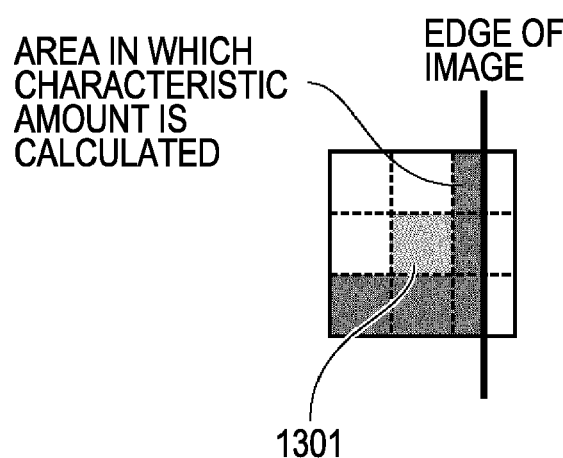
FIGS. 14A and 14B illustrate the surrounding area if the candidate for a red eye area exists near an edge of an image.
Figure 14B:
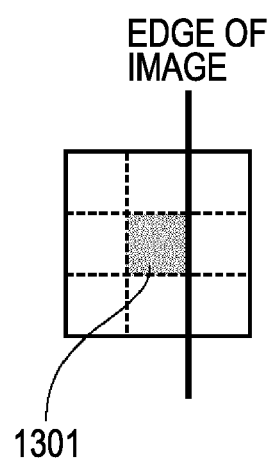

FIGS. 14A and 14B illustrate the surrounding area if the candidate for a red eye area exists near the edge of the image.

FIG. 14A shows a case in which the circumscribed rectangle (the block 1301) of the candidate for a red eye area exists near the right edge of the image with some margin being left. In this case, if at least one pixel exists in each block in the surrounding area, the pixel is used to determine the characteristic amounts.

In contrast, FIG. 14B shows a case in which the block 1301 is contact with the right edge of the image with no margin being left. In this case, since no pixel exist in three blocks including the upper right (TR), the right (R), and the lower right (BR) blocks, among the surrounding blocks, it is not possible to calculate the characteristic amounts of the surrounding blocks. In such a case, according to the first embodiment of the present invention, it is determined that the block 1301 is not a red eye area and the block 1301 is excluded from the candidate area list.

Determination of Group 0 of Characteristic Amounts (Step S10)

In the determination of Group 0 of characteristic amounts, for example, a surrounding area having a size three times larger than that of the block 1301 is set for the block 1301, as shown in FIG. 13B, the red evaluation amount Er of each pixel in the blocks including the block 1301 is calculated according to Equation (3), and the average Er(ave) of the red evaluation amounts Er is calculated. The calculated average Er(ave) is stored in an array AEvR[8] in the RAM 103. The array AEvR holds nine elements from 0 to 8. The elements are sequentially allocated to the blocks from the upper left block to the lower right block. Specifically, the element 0 is allocated to the upper left (TL) block, the element 1 is allocated to the upper (T) block, the element 2 is allocated to the upper right (TR) block, and so on in FIG. 13A.

Then, it is determined whether Expression (12) is satisfied in the elements i=0 to 8 (i=4 for the block 1301 is excluded).

[Formula 12]

$$AEvR[i] < AEvR[4] \times Th\_FJ0\_EvR \tag{12}$$

Expression (12) means that the candidate for a red eye area is a red eye area if a value given by multiplying the average AEvR[4] of the evaluation amounts in the block 1301 by a threshold value Th_FJ0_EvR is larger than the average AEvR [i] of the evaluation amounts in the remaining eight surrounding blocks. If Expression (12) is not satisfied, it is determined that the candidate for a red eye area is not a red eye area, and the subsequent determinations of the characteristic amounts are not performed to proceed to determination of the subsequent candidate for a red eye area.

The comparison of the red evaluation amounts Er according to Expression (12) is performed because the characteristics of the red eye area are most prominent in the red evaluation amount Er, among the characteristic amounts described below. Various experiments show that the determination according to Expression (12) is most effective for exclusion of areas other than the red eye area from the candidate area list. Accordingly, sequentially determining the characteristic amounts from the characteristic amount that is most easily determined allows the amount of calculation in the characteristic amount determining unit 204 to be minimized.

Figure 15A:
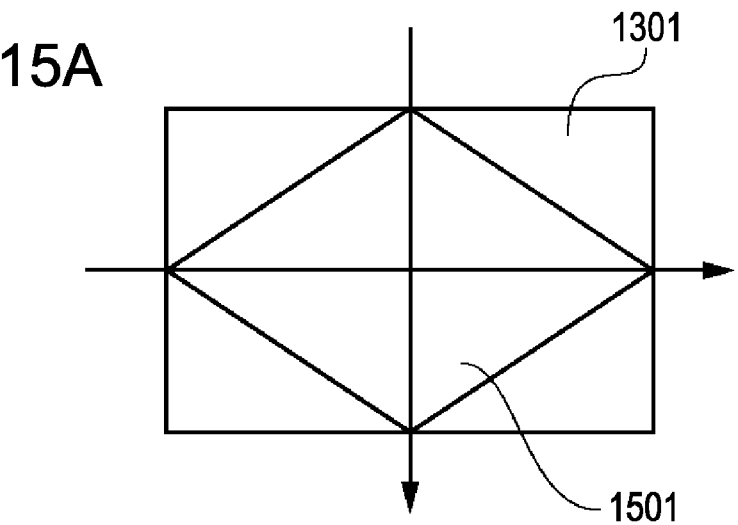
FIGS. 15A to 15C illustrate areas in which an average of pixels in a block is calculated.
Figure 15B:
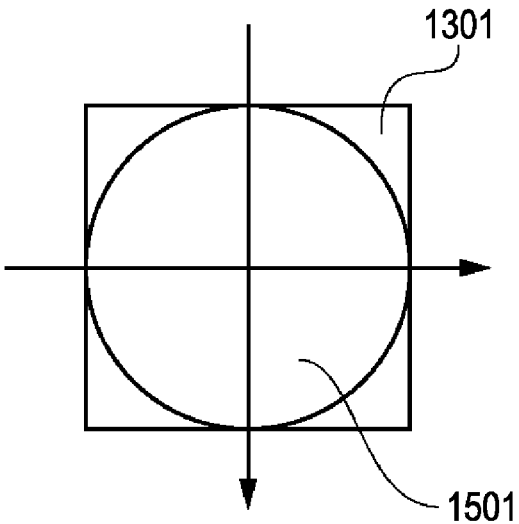
Figure 15C:
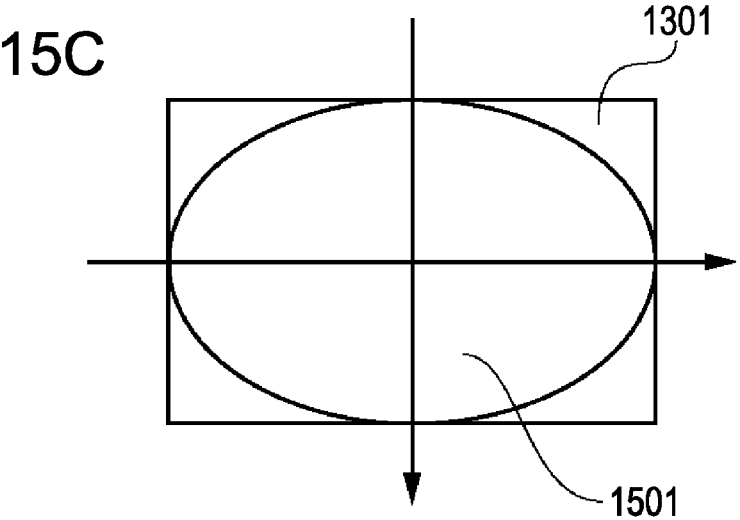

In the calculation of the average Er(ave) in each block, it is desirable in the block 1301 that the red evaluation amounts Er be calculated only for the pixels in a rhombus calculation area 1501 shown in FIG. 15A. Since the shape of the red eye area is normally a circle or an ellipse, pixels having lower levels of red exist at the four corners of the block 1301. Hence, the red evaluation amounts Er should be calculated for the pixels excluding the ones at the four corners of the block 1301 in order not to decrease the average Er(ave) of the red evaluation amounts Er in the block 1301. It is possible to yield a similar or superior result also by calculating the red evaluation amounts Er in an inscribed circle (FIG. 15B) or in an inscribed ellipse (FIG. 15C) of the block 1301, in addition to the rhombus area 1501 in FIG. 15A.

Determination of Group 1 of Characteristic Amounts (Step S11)

In the determination of Group 1 of characteristic amounts, the image data only in the candidate for a red eye area (the block 1301 in FIGS. 13A to 13C) are referred to to determine whether the candidate for a red eye area is a red eye area. The determination of Group 1 of characteristic amounts includes, for example, the following steps.

First, it is determined whether the average Er(ave) of the red evaluation amounts Er of pixels having a hue of ±30 degrees, in the candidate for a red eye area, is higher than a threshold value Th_FJ1_EMin and is lower than a threshold value Th_FJ1_EMax. If this determination is not satisfied, the target candidate for a red eye area is excluded from the candidate area list. The hue can be provided by a known method.

Next, the maximum and minimum values in the red evaluation amounts Er of pixels having a hue of ±30 degrees, in the candidate for a red eye area, are provided to calculate a ratio R=the minimum value/the maximum value. Since the red evaluation amounts Er are greatly varied in the candidate for a red eye area, the ratio R has a smaller value. Accordingly, the ratio R is compared with a threshold value Th_FJ1_EMaxMinRatio according to Expression (13) and, if Expression (13) is not satisfied, the target candidate for a red eye area is excluded from the candidate area list.
[Formula 13]

$$R < Th\_FJ1\_EMaxMinRatio \qquad (13)$$

Next, a standard deviation of the R component is calculated in the candidate for a red eye area. Since a bright red area and a darker area near the boundary between the red eye area and the pupil area are included in the red eye area, the dynamic range of the R component has a substantially large value. Accordingly, the measurement of the standard deviation of the R component in the red eye area results in a larger value. For this reason, a standard deviation δr of the R component is measured by a known method in the candidate for a red eye area to determine whether the standard deviation δr is larger than a threshold value Th_FJ1_RDiv according to Expression (14):
[Formula 14]

$$\delta r > Th\_FJ1\_RDiv \qquad (14)$$

The target candidate for a red eye area that does not satisfy Expression (14) is excluded from the candidate area list. Although the standard deviation of the R component is described above, a similar determination can be performed by the use of dispersion of the R component.

In order to determine the variation of the R component, an average SDr(ave) of the sums of the differences of the R component between neighboring pixels may be calculated in the candidate for a red eye area to determine whether the calculated average SDr(ave) is larger than a threshold value TH_FJ1_RDiff according to Expression (15):
[Formula 15]

$$SDr(ave) > Th\_FJ1\_RDiff \qquad (15)$$

There are various methods of calculating the average of the sums of the differences between neighboring pixels. For example, the average of the sums of the differences between the target pixel and the neighboring eight pixels may be calculated or the difference between the target pixel and the left pixel may be calculated. In addition, the above determination can be performed in the same manner for the G or B component, in addition to the R component, or for the luminance or the red evaluation amount Er.

Determination of Group 2 of Characteristic Amounts (Step S12)

In the determination of Group 2 of characteristic amounts, the surrounding area is set for the candidate for a red eye area remaining in the candidate area list as a result of the determination of Group 1 of characteristic amounts, and determination relating to the luminance components in the surrounding area is performed. The determination of Group 2 of characteristic amounts includes, for example, the following steps.

First, a surrounding area (for example, the area having a size five times larger than that the block 1301, shown in FIG. 13C) is set for the candidate for a red eye area. Next, an average luminance Y(ave) of the eight surrounding areas excluding the block 1301 is calculated and it is determined whether the average luminance Y(ave) is larger than a threshold value TH_FJ2_YMin and is smaller than a threshold value Th_FJ2_YMax. If the average luminance Y(ave) is not within the range between the threshold value TH_FJ2_YMin and the threshold value Th_FJ2_YMax, that is, if the surrounding area of the block 1301 is extremely bright or dark, the target candidate for a red eye area is excluded from the candidate area list.

The above determination of the luminance may be performed to the eight surrounding blocks. Alternatively, the average luminance Y(ave) may be calculated for every block in the surrounding area and the calculated average luminance Y(ave) may be compared with a predetermined threshold value.

Next, a surrounding area having a size two times larger than that of the candidate for a red eye area is set for the candidate for a red eye area (FIG. 13A), the average luminance Y(ave) of each of the eight surrounding blocks excluding the block 1301 is calculated, and the maximum value Ymax and the minimum value Ymin in the eight average luminances are yielded. Since the brightness of the surrounding area is possibly greatly varied when the surrounding area having a size two times larger than that of the candidate for a red eye area is set, determination is performed according to Expression (16):
[Formula 16]

$$(Ymax - Ymin) > Th\_FJ2\_MaxMinDiff2 \qquad (16)$$

If Expression (16) is not satisfied, the target candidate for a red eye area is excluded from the candidate area list.

In addition, a surrounding area having a size five times larger than that of the candidate for a red eye area is set for the candidate for a red eye area (FIG. 13C), the average luminance Y(ave) of each of the eight surrounding blocks is calculated, as described above, and the maximum value Ymax and the minimum value Ymin in the eight average luminances are yielded. When the relatively large surrounding area having a size five times larger than that of the candidate for a red eye area is set, most of the surrounding area is the flesh-colored area and, therefore, it seems unlikely that the luminance is greatly varied in the surrounding area. Accordingly, determination is performed according to Expression (17), unlike the case where the surrounding area having a size two times larger than that of the candidate for a red eye area is set.
[Formula 17]

$$(Ymax - Ymin) > Th\_FJ2\_MaxMinDiff5 \qquad (17)$$

If Expression (17) is not satisfied, the target candidate for a red eye area is excluded from the candidate area list.

Determination of Group 3 of Characteristic Amounts (Step S13)

In the determination of Group 3 of characteristic amounts, the surrounding area is set for the candidate for a red eye area remaining in the candidate area list as a result of the determinations of Group 1 of characteristic amounts and of Group 2 of characteristic amounts, and determination relating the saturation and hue in the surrounding area is performed. The determination of Group 3 of characteristic amounts includes, for example, the following steps.

First, a surrounding area (for example, the area having a size five times larger than that of the block 1301, shown in FIG. 13C) is set for the candidate for a red eye area, and a ratio Rh of the number of pixels having a hue of ±Th_FJ3_HRange is calculated in the eight surrounding areas excluding the block 1301. Since the surrounding area of the red eye area is the flesh-colored area, the hue of most of the pixels should be within the range of ±Th_FJ3_HRange. Accordingly, if the calculated ratio Rh is higher than or equal to a threshold value Th_FJ3_HRatio, the target area is determined as the candidate for a red eye area. If the calculated ratio Rh is lower than the threshold value Th_FJ3_HRatio, the target candidate for a red eye area is excluded from the candidate area list. The ratio Rh is calculated according to Equation (18):
[Formula 18]

$$Rh = Nh/\Sigma N \quad (18)$$

where "Nh" denotes the number of pixels having a hue of Th_FJ3_HRange and "ΣN" denotes the number of pixels in the eight blocks.

Next, a surrounding area (for example, the area having a size five times larger than that of the block 1301, shown in FIG. 13C) is set for the candidate for a red eye area, and an average saturation S(ave) of the eight blocks in the surrounding area is calculated. It is determined whether the average saturation S(ave) is larger than a threshold value Th_FJ3_SMin and is smaller than a threshold value Th_FJ3_SMax. If the average saturation S(ave) is outside the range from the threshold value Th_FJ3_SMin to the threshold value Th_FJ3_SMax, the target candidate for a red eye area is excluded from the candidate area list.

The above determination of the saturation may be performed for every block. Specifically, the average saturation S(ave) may be calculated for every block in the surrounding area to compare the calculated average saturation S(ave) with a predetermined threshold value.

A so-called white area of the eye probably exists around the red eye area. Accordingly, a ratio S/L of the saturation S to the luminosity L is lower than a threshold value Th_FJ3_WhitePix in the surrounding area (for example, the area having a size three times larger than that of the block 1301, shown in FIG. 13B) set for the candidate for a red eye area. If any pixel having a lower saturation S and a higher luminosity L exists, the pixel is determined as the candidate for a red eye area. If the ratio S/L is not lower than the threshold value Th_FJ3_WhitePix in the candidate for a red eye area, the target candidate for a red eye area is excluded from the candidate area list.

Determination of Group 4 of Characteristic Amounts (Step S14)

In the determination of Group 4 of characteristic amounts, the surrounding area is set for the candidate for a red eye area remaining in the candidate area list as a result of the determinations of Group 1 to Group 3 of characteristic amounts, and determination relating an edge in the surrounding area is performed. Since a very clear edge exists near the eyes of a person, the edge can be an effective characteristic amount. Although the known Sobel filter is used for detecting the edge, the method is not limited to this filter. It is possible to perform the same determination even with another edge detection filter. Since the Sobel filer is well known, a detailed description of the Sobel filter is omitted herein. The determination of Group 4 of characteristic amounts includes, for example, the following steps.

First, a surrounding area (for example, the area having a size two times larger than that of the block 1301, shown in FIG. 13A) is set for the candidate for a red eye area, and the Sobel filter is used for each pixel in the surrounding area. An average So(ave) of the Sobel output values yielded for every pixel is calculated. Since a very clear edge normally exists near the eyes of a person, the average So(ave) is compared with a threshold value Th_FJ4_SobelPow. If the average So(ave) is smaller than or equal to the threshold value Th_FJ4_SobelPow, the target candidate for a red eye area is excluded from the candidate area list.

Next, a surrounding area (for example, the area having a size three times larger than that of the block 1301, shown in FIG. 13B) is set for the candidate for a red eye area, and the Sobel filter is used for each pixel in the surrounding area. A difference Ds between the maximum value and the minim value of the Sobel output values yielded for every pixel is calculated. Since a very clear edge normally exists near the eyes of a person and the flesh-colored flat portions also exist near the eyes of the person, the difference Ds should have a relatively large value. Accordingly, the difference Ds is compared with a threshold value Th_FJ4_MaxMinDiff. If the difference Ds is smaller than or equal to the threshold value Th_FJ4_MaxMinDiff, the target candidate for a red eye area is excluded from the candidate area list.

In addition, a surrounding area (for example, the area having a size three times larger than that of the block 1301, shown in FIG. 13B) is set for the candidate for a red eye area, and the Sobel filter is used for each pixel in the surrounding area. The Sobel output values yielded for every pixel are stored in an array sobel[y][x] in the RAM 103 as an edge image. Then, a centroid (Xw,Yw) of the edge image is calculated. The centroid (Xw,Yw) is calculated according to Equation (19):
[Formula 19]

$$(Xw, Yw) = (\Sigma x \cdot Sobel[y][x]/Sobel[y][x], \Sigma y \cdot Sovel[y][x]/Sobel[y][x]) \quad (19)$$

If the candidate for a red eye area is in the eye of a person, the centroid (Xw,Yw) should exist near the center of the edge image. Accordingly, it is determined whether the centroid (Xw,Yw) is in, for example, the block 1301. If the centroid (Xw,Yw) is in the block 1301, the target area is determined as a candidate for a red eye area. If the centroid (Xw,Yw) is not in the block 1301, the target candidate for a red eye area is excluded from the candidate area list.

Figure 17:
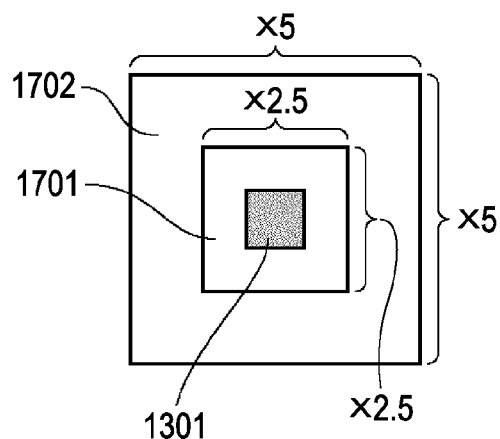
FIG. 17 illustrates how to set the surrounding area.

Furthermore, a surrounding area having a size five times larger than that of the candidate for a red eye area is set for the candidate for a red eye area (FIG. 13C), and the Sobel filter is used for each pixel in the surrounding area. The Sobel output values yielded for every pixel are stored in an array Sobel[y][x] as an edge image. The array Sobel[y][x] has a size corresponding to the number of pixels in the surrounding area having a size five times larger than that of the candidate for a red eye area. Then, two areas shown in FIG. 17, that is, a central area 1701 and an outer area 1702 are defined for the surrounding area including the block 1301. Averages of the Sobel output values stored in the array Sobel[y][x] are calculated for the central area 1701 and the outer area 1702. Although the central area 1701 has a size two and a half times larger than that of the block 1301 in FIG. 17, the central area 1701 is not limited to this size. Since a clearer edge exits in the central area 1701, compared with the outer area 1702, near the eye of a person, a ratio of an average $SPow^{in}$ of the Sobel output values for the central area 1701 to an average $SPow^{out}$ of the Sobel output values for the outer area 1702 is compared with a threshold value Th_FJ4_InOutRatio according to Expression (20):
[Formula 20]

$$SPow^{in}/SPow^{out} > Th\_FJ4\_InOutRatio \quad (20)$$

If Expression (20) is satisfied, the target candidate for a red eye area is determined as a red eye area. If Expression (20) is not satisfied, the target candidate for a red eye area is not determined as a red eye area and is excluded from the candidate area list.

As an application of the above comparison, the average $SPow^{in}$ and the average $SPow^{out}$ may be compared with different threshold values.

The characteristic amount determining unit 204 finally determines the candidate for a red eye area satisfying all (or part of) the determinations of Group 0 to Group 4 of characteristic amounts as a red eye area and supplies the candidate area list including the determined red eye area to the correcting unit 205.

Correcting Unit 205

The correcting unit 205 receives the input image data including the RGB components and the candidate area list including the red eye areas yielded from the above steps.

Figure 18:
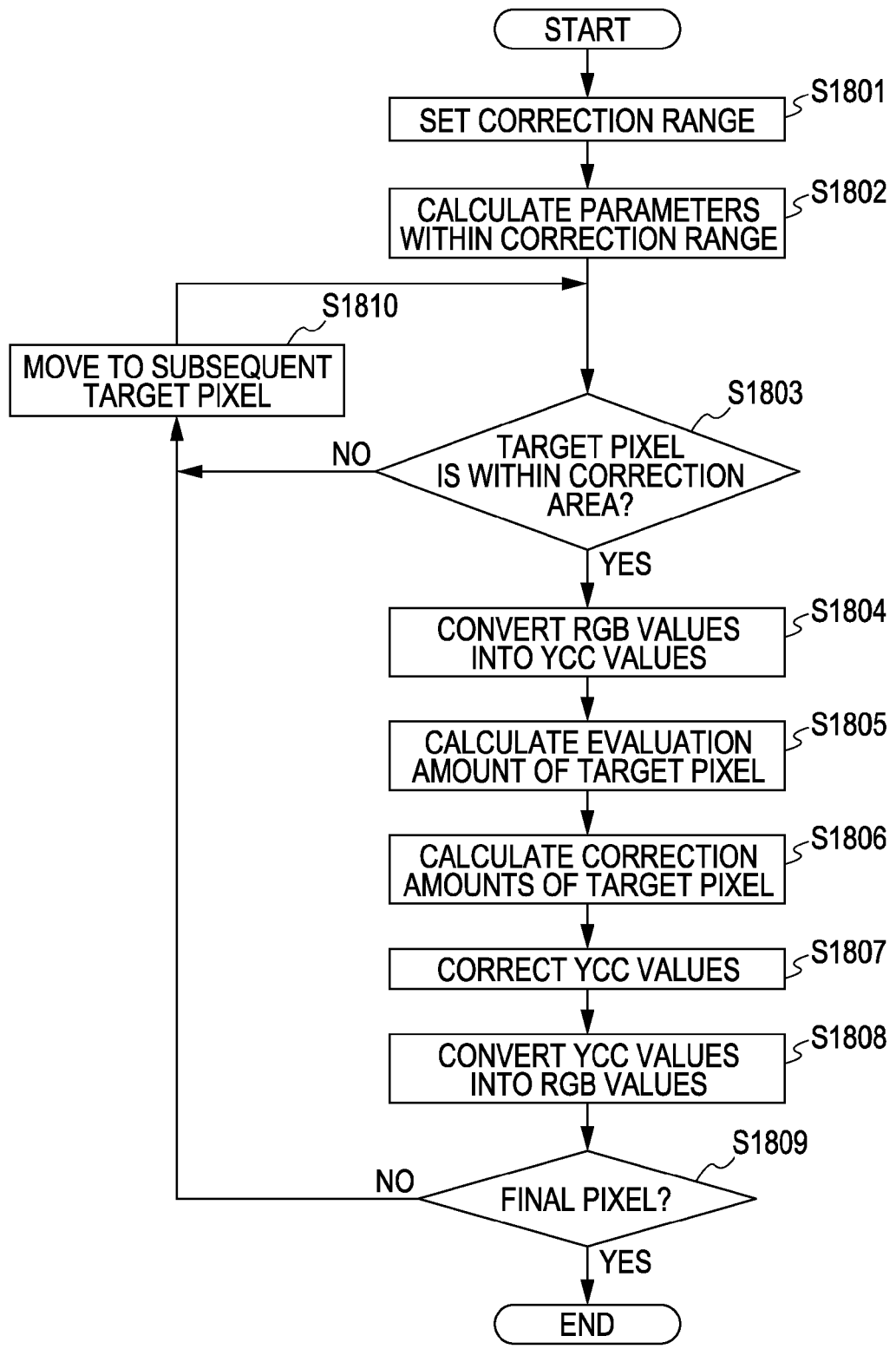
FIG. 18 is a flowchart showing an example of a process of correcting one of the red eye areas in a candidate area list.

FIG. 18 is a flowchart showing an example of a process of correcting one of the red eye areas in the candidate area list, performed by the correcting unit 205. The correcting unit 205 corrects the red eye areas in the candidate area list one by one in the process shown in FIG. 18.

Figure 19:
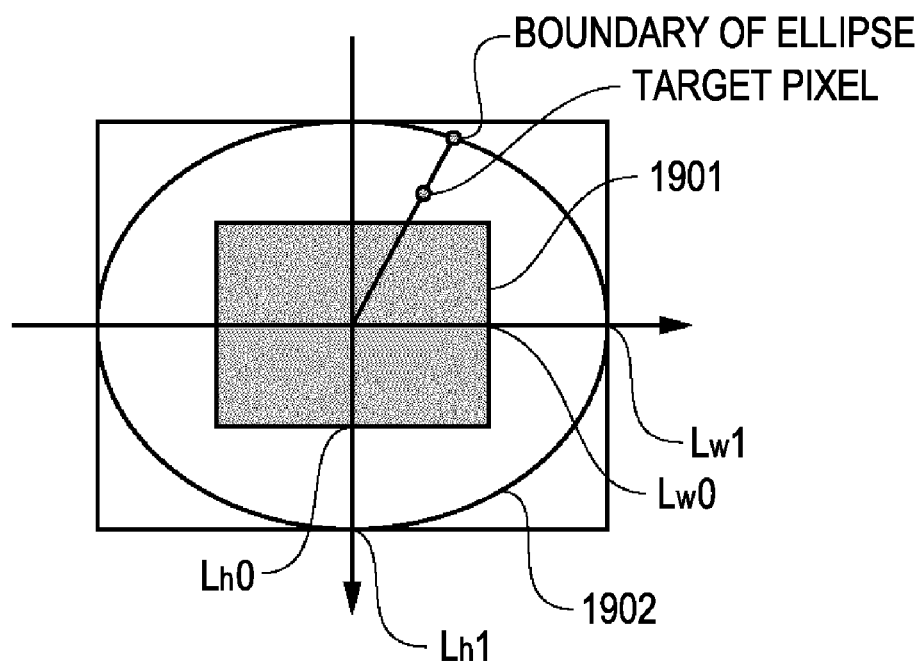
FIG. 19 illustrates determination of a correction range.

In Step S1801, the process sets a correction range for the candidate for a red eye area. FIG. 19 illustrates determination of the correction range.

Referring to FIG. 19, a central rectangular area is a red eye area 1901 included in the candidate area list. An elliptical correction area 1902 that passes through the center of the red eye area 1901 and that has a major axis Lw1 and a minor axis Lh1 is set. The major axis Lw1 and the minor axis Lh1 are calculated according to Equation (21):

[Formula 21]

$$Lw1 = Lw0 \times \text{CPARAM\_AREARATIO}$$

$$Lh1 = Lh0 \times \text{CPARAM\_AREARATIO} \tag{21}$$

where "Lw0" is equal to half of the width of the red eye area 1901, "Lh0" is equal to half of the height of the red eye area, and "CPARAM_AREARATIO" denotes a parameter used for setting the correction range.

In Step S1802, the process calculates parameters necessary for the correction in the correction area 1902. The parameters to be calculated are a maximum luminance Ymax in the elliptical correction area 1902 and a maximum value Ermax in the red evaluation amount Er calculated according to Equation (3).

In Step S1803, the process determines whether the target pixel is within the correction area 1902. Whether the target pixel is within the elliptical correction area 1902 is determined according to Expression (22) for calculating an ellipse.

[Formula 22]

$$(x/Lw1)^2 + (y/Lh1)^2 \leq 1 \tag{22}$$

where "(x,y)" denotes the coordinate of the target pixel and the origin of the coordinates is at the center of the target red eye area.

If the coordinate (x,y) of the target pixel satisfies Expression (22), the process determines that the target pixel is within the correction area 1902 and proceeds to Step S1804. If the process determines that the target pixel is not within the correction area 1902, then in Step S1810, the process moves the target pixel to the subsequent pixel and, then, goes back to Step S1803.

In Step S1804, the process converts the RGB values of the target pixel into YCC values representing the luminance and color difference components. The conversion is performed by any of various methods.

In Step S1805, the process calculates evaluation amounts of the target pixel. The evaluation amounts are parameters necessary for determination of correction amounts in Step S1806. Specifically, the process calculates the following three evaluation amounts:

(1) A ratio r/r0 between the distance r between the center of the red eye area 1901 and the target pixel and the distance r0 between the center of the red eye area 1901 and the boundary of the ellipse (2) A ratio Er/Ermax between the red evaluation amount Er of the target pixel and the maximum value Ermax of the evaluation amounts (3) A ratio Y/Ymax between the luminance Y of the target pixel and the maximum luminance Ymax In Step S1806, the process uses the parameters calculated in Step S1805 to calculate a correction amount Vy of the luminance Y of the target pixel and a correction amount Vc of the color difference components Cr and Cb of the target pixel according to Equation (23):

[Formula 23]

$$Vy = \{1Rr^{Ty1}\} \cdot \{1-(1-Re)^{Ty2}\} \cdot \{1-Ry^{Ty3}\} Vc = \{1-Rr^{Tc1}\} \cdot \{1-(1-Re)^{Tc2}\} \tag{23}$$

where Rr=r/r0, Re=Er/Ermax, and Ry=Y/Ymax.

Both the correction amount Vy and the correction amount Vc are within a range from 0.0 to 1.0. The correction amounts become larger as the correction amounts are approximated to 1.0. The correction amount Vy of the luminance Y is determined by the use of all the three parameters and becomes smaller as distance between the position of the target pixel and the center of the correction area 1902 is increased. If the red evaluation amount Er of the target pixel is smaller than the maximum value Ermax, the correction amount Vy becomes smaller. If the luminance Y of the target pixel is approximated to the maximum luminance Ymax, the correction amount Vy becomes smaller. Making the correction amount Vy of a pixel having a higher luminance small has an effect of keeping a highlight portion (catch light) in the eye. In contrast, the correction amount Vc is yielded by excluding the parameters relating to the luminance.

Figure 20:
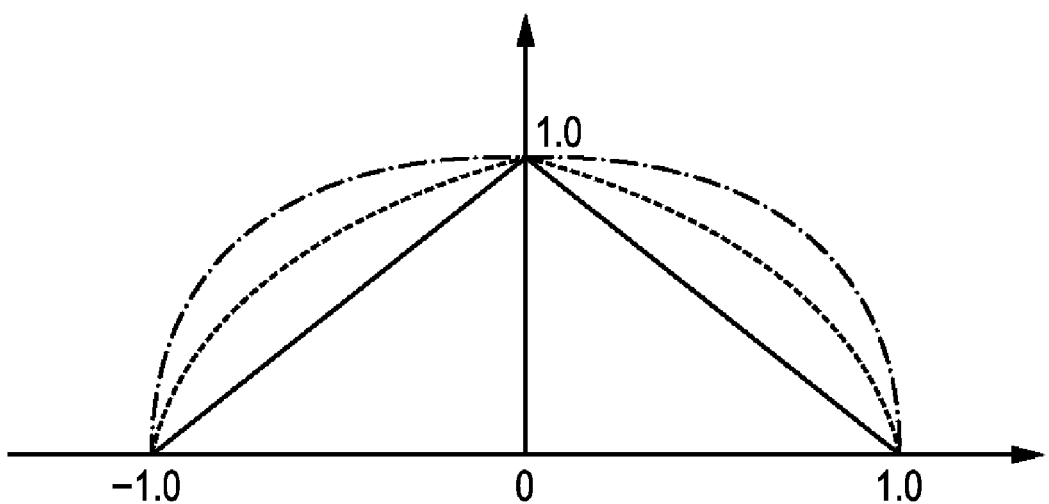
FIG. 20 illustrates how to set correction parameters.

In Equation (23), "Ty1", "Ty2", "Ty3", "Tc1", and "Tc2" denote parameters. It is possible to represent each evaluation amount (that is, each of the values surrounded by { } in Equation (23)) by a first order (solid line), a second order (broken line), or a third order (chain line) straight or curved line, as shown in FIG. 20, depending on how these parameters are set.

In Step S1807, the process corrects an YCC value after the correction according to Equation (24) by the use of the correction amounts Vy and Vc.

[Formula 24]

$$Y' = (1.0 - Wy \cdot Vy) \cdot Y$$

$$C' = (1.0 - Wc \cdot Vc) \cdot C \tag{24}$$

where "Y" and "C" denote values before the correction, "Y'" and "C'" denote values after the correction, and "Wy" and "Wc" denote weights (0.0 to 1.0).

The weights Wy and Wc are adjusted to specify the correction intensity. For example, when the correction intensity has three levels of low, medium, and high, setting both the weights Wy and Wc to, for example, 0.3, 0.7, or 1.0 provides results having different levels of the correction intensity in the same processing.

After new values of the luminance and color difference components are determined, then in Step S1808, the process converts the YCC values into RGB values. Then, the process overwrites the memory buffer for the input images with the RGB values as the pixel values after the correction, or stores the RGB values in a predetermined address in the memory buffer for the output images.

In Step S1809, the process determines whether the target pixel is the final pixel in the target red eye area. If the process determines that the target pixel is not the final pixel in the target red eye area, then in Step S1810, the process moves the target pixel to the subsequent pixel and repeats the above steps from S1803 to S1808. If the process determines in Step S1809 that the target pixel is the final pixel in the target red eye area, the process proceeds to correction of the subsequent red eye area and repeats the correction for all the red eye areas recorded in the candidate area list.

Although the RGB components of the input image supplied to the correcting unit 205 are converted into the luminance and color difference components, the luminance and color difference are corrected, and the luminance and color difference components are converted into the RGB components in the above method, the first embodiment of the present invention is not limited to the above method. Similar results can be achieved by, for example, converting the RGB components into the luminosity and saturation components, correcting the luminosity and saturation in the same manner as in the above method, and converting the luminosity and saturation components into the RGB components.

Although the ratio Er/Ermax between the red evaluation amount Er of the target pixel and the maximum value Ermax of the evaluation amounts in the correction area 1902 is used as the parameter for determining the correction amount in the above method, the parameter may be replaced with the saturation. That is, the ratio between the saturation of the target pixel and the maximum saturation in the correction area 1902 may be used to determine the correction amount.

As described above, the determination of whether the target pixel is a pixel in the red eye area by using the red evaluation amount Er calculated from the R and G components, instead of the saturation, allows the red eye of a person having the eyes with darker pigment to be accurately extracted. Also, applying the border following to the binarized image corresponding to the candidate for a red eye area allows the high-speed extraction of the red circular area from the binarized image with an extremely small amount of calculation. In addition, the red eye area can be accurately determined by calculating various characteristic amounts indicating the red eye from the red circular area and evaluating the calculated characteristic amounts. Furthermore, the characteristic amounts are determined in an appropriate order, in consideration of the effect of the determination of the individual characteristic amounts and the amount of calculation in the calculation of the characteristic amounts, and the candidates for red eye areas are filtered to exclude the candidate area that are probably not the red eye area. Accordingly, it is possible to realize the detection of the red eye area with a minimum amount of processing.

Second Embodiment

Image processing according to a second embodiment of the present invention will now be described. The same reference numerals are used in the second embodiment to identify approximately the same components as in the first embodiment. A detailed description of such components is omitted herein.

Figure 21A:
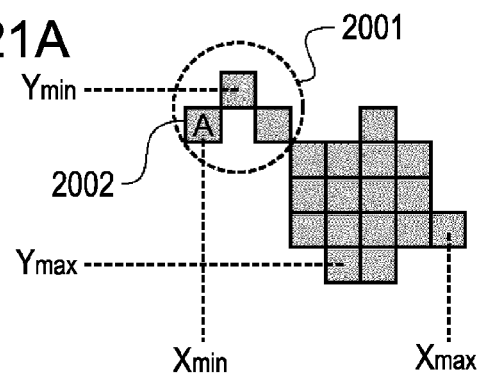
FIGS. 21A and 21B illustrate a challenge in a second embodiment of the present invention.

In the adaptive binarization described above in the first embodiment of the present invention, the window area 403 (refer to FIG. 4) having a predetermined size is set at the left of the target pixel (ahead of the primary scanning direction), the average Er(ave) of the evaluation amounts of the pixels in the window area 403 is calculated, and the binarization is performed by using the average Er(ave) as the threshold value depending on whether target pixel is in the red area. The number of pixels that are referred to to calculate the threshold value is small in such a method, thus increasing the speed of the processing. However, since the window area 403 is set only at the left of the target pixel, the result of the binarization depends on the direction of the processing. As a result, when the adaptive binarization is applied to the image shown in FIG. 5A, there are cases where an eyeline 2001 is extracted as pixels in the red area, in addition to the portion corresponding to the pupil in the red eye area, as shown in FIG. 21A. This is based on the following reasons.

According to the first embodiment of the present invention, the threshold value used for binarizing a target pixel 2002 is an average Er(ave) of the evaluation amounts of the pixels in the window set at the left of the target pixel 2002 and the binarization is performed on the basis of a result of comparison between the red evaluation amount Er of the target pixel 2002 and the average Er(ave) (refer to Expression (6)). Since the window is at the left of the portion corresponding to the pupil to be extracted, the window is normally set in the flesh-colored area. The pixel value of the flesh-colored area of a person having lighter pigment is equal to, for example, (R,G,B)=(151,135,110). The calculation of the red evaluation amount Er according to Equation (3) results in 11%, which is a relatively small value. In contrast, the target pixel 2002 forming the eyeline 2001 has a lower luminance than that of the flesh-colored area and the pixel value is equal to, for example, (R,G,B)=(77,50,29). The calculation of the red evaluation amount Er according to Equation (3) results in 35%. As apparent from the above figures, the red evaluation amount Er of the target pixel forming the eyeline 2001 is larger than the red evaluation amount Er of the flesh-colored area in the window. Accordingly, the target pixel 2002 is likely to be extracted as a pixel in the red area in the adaptive binarization according to the first embodiment, although this result depends on the parameter Margin_RGB.

As a result, a red area surrounded by coordinates (xmin, ymin) and (xmax,ymax), shown in FIG. 21A, is extracted. When this extracted result is supplied to the red-circular-area extracting unit 203, the extraction of the red circular area is performed to an area wider than the original red circular area and, thus, a reduction in the reliability of the extracted result and an increase in the extraction time can be caused.

If a window having the same size is set also at the right of the target pixel 2002, the window includes the pixels forming the eyeline and, in some cases, the pixels corresponding to the pupil of the red eye, in addition to the pixels corresponding to the flesh-colored area. Accordingly, the average Er(ave) of the evaluation amounts in the window set at the right of the target pixel 2002 is increased. Consequently, the target pixel 2002 is unlikely to be determined as the pixel in the red area because the target pixel 2002 does not have a prominent red evaluation amount Er, compared with the pixel in the window set at the right of the target pixel 2002.

An example in which windows are set at both the left and the right of the target pixel in the adaptive binarization performed by the red area extracting unit 202 will be described as the second embodiment of the present invention.

Figure 22A:
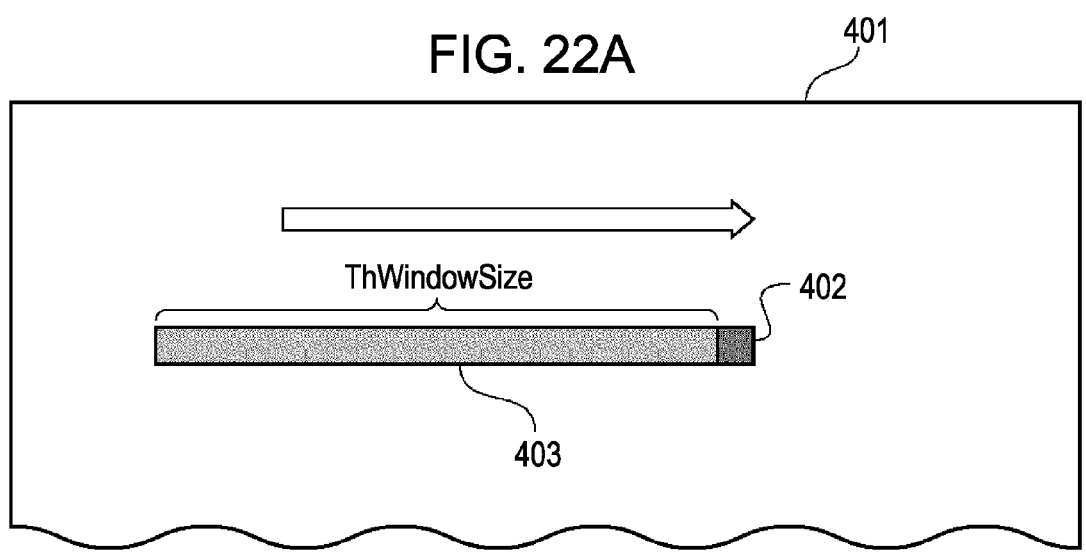
FIGS. 22A and 22B illustrate adaptive binarization according to the second embodiment of the present invention.
Figure 22B:
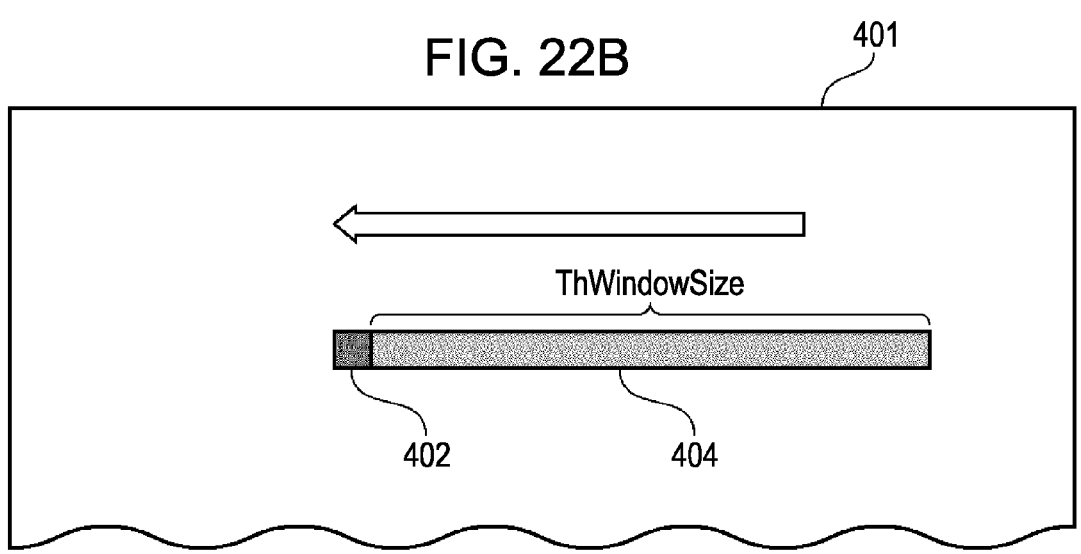

In the adaptive binarization according to the second embodiment of the present invention, first, the window area 403 is set at the left of the target pixel 402, as shown in FIG. 22A, and the target pixel 402 is binarized in the same manner as in the first embodiment. Then, the binarization result is stored in a buffer for the binarized image in the RAM 103 while shifting the target pixel 402 from left to right, as shown by an arrow in FIG. 22A.

After the target pixel 402 reaches the right end of the line and the binarization in the direction where the target pixel 402 is shifted from left to right is terminated, the binarization is performed where the target pixel 402 is shifted in the opposite direction from right to left in the same line, as shown in FIG.

22B. In this case, a window 404 used for setting a threshold value for the binarization is set at the right of the target pixel 402.

In the above binarization in both directions, the pixel having the value "1" as the binarization result is stored in the buffer for the binarized image as a pixel in the red area.

Figure 21B:
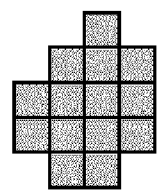

FIG. 21B shows an example of pixels in the red area, resulting from the adaptive binarization in both directions. Since the pixels corresponding to an eyeline etc. are excluded in FIG. 21B, the red area is appropriately extracted, compared with the result of the adaptive binarization only in one direction (FIG. 21A).

As described above, in the extraction of the red area by the adaptive binarization process, it is possible to accurately extract the pixel in the red area by setting the window where the binarization threshold value is calculated at the left and right directions with respect to the target pixel.

Third Embodiment

Image processing according to a third embodiment of the present invention will now be described. The same reference numerals are used in the third embodiment to identify approximately the same components as in the first and second embodiments. A detailed description of such components is omitted herein.

Figure 23:
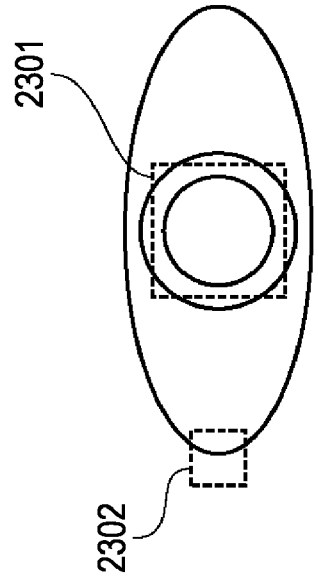
FIG. 23 illustrates a challenge in a third embodiment of the present invention.

Methods of extracting a pixel in the red area by the adaptive binarization on the basis of the red evaluation amount Er defined in Equation (3) are described in the first and second embodiments of the present invention. With such methods, pixels corresponding to the outer or inner corner 2302 of the eye are possibly detected as the pixels in the red area, in addition to the pupil 2301 of the red eye shown in FIG. 23. Enlargement of the outer or inner corner 2302 of the eye shows that many "dark red" pixels having, for example, a pixel value (R,G,B)=(81,41,31) exist. The red evaluation amount Er of these pixels is equal to 49%, which is a relatively large value. Accordingly, in the adaptive binarization according to first and second embodiments of the present invention, a collection of pixels, having a certain size, is probably detected. In addition, the luminosity, hue, and saturation of the edge and the surrounding area exhibit the characteristics of an eye. Consequently, all the determinations are satisfied in the red-circular-area extracting unit 203 and the characteristic amount determining unit 204 and it is likely to erroneously determine the pixels that are not in the red eye area as those that are in the red eye area. In order to resolve this problem, a structure according to the third embodiment of the present invention will be described.

Figure 24:
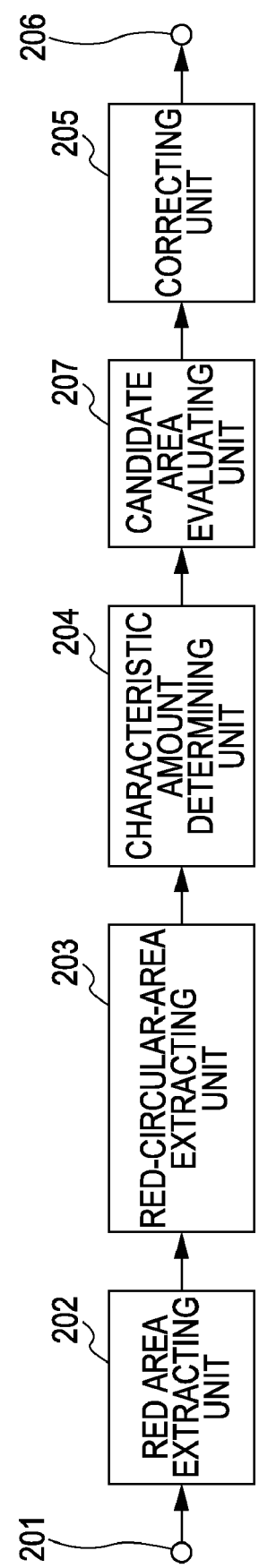
FIG. 24 is a functional block diagram showing the summary of a process of automatically correcting a red eye according to the third embodiment of the present invention.

FIG. 24 is a functional block diagram showing the summary of a process of automatically correcting a red eye according to the third embodiment of the present invention. The process is performed by the CPU 101. A candidate area evaluating unit 207 is added to the process shown in FIG. 2, compared with the first embodiment of the present invention.

The candidate area evaluating unit 207 refers to the candidate area list generated in the upstream steps and evaluates the relative position and area of each candidate for a red eye area to sort the candidates for red eye areas. In other words, a candidate for a red eye area determined as an area that is not appropriate for the red eye area in the evaluation is excluded from the candidate area list.

Figure 25:
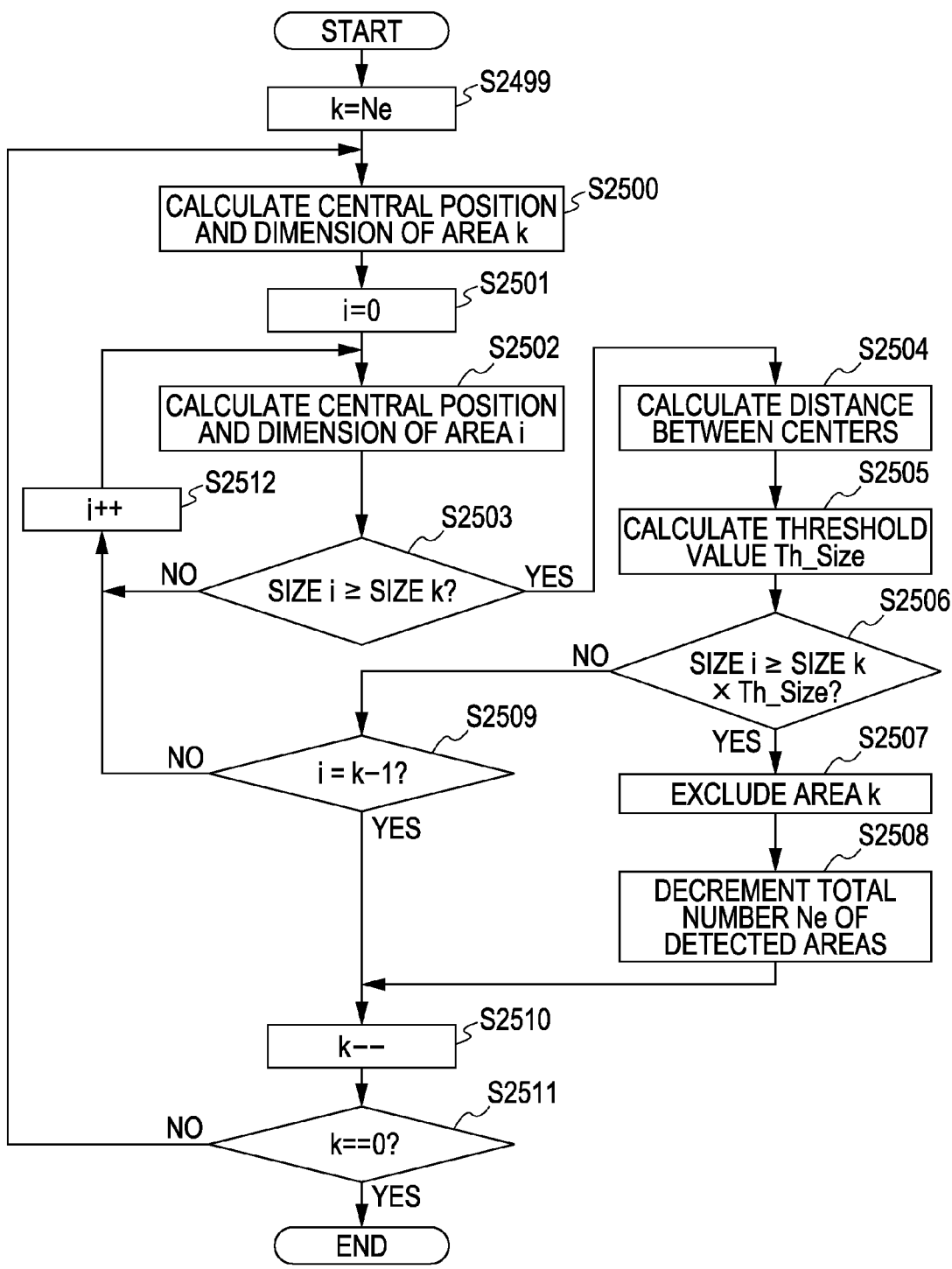
FIG. 25 is a flowchart showing an example of a process performed by a candidate area evaluating unit.

FIG. 25 is a flowchart showing an example of a process performed by the candidate area evaluating unit 207. It is presumed that the characteristic amount determining unit 204 extracts k-number (0 to k−1) of areas as the candidates for red eye areas (the total number Ne of detected areas is equal to "k").

Referring to FIG. 25, in Step S2499, the process sets the total number Ne of detected areas in a counter k. In Step S2500, the process calculates the central position and dimension of the k-th candidate for a red eye area (hereinafter referred to as an area k). The dimension means the length of the short side of the candidate for a red eye area extracted as a rectangular area. In Step S2501, the process sets zero in a counter i. In Step S2502, the process calculates the central position and dimension of the i-th candidate for a red eye area (hereinafter referred to as an area i) stored in the candidate area list. In Step S2503, the process compares the size (hereinafter referred to as a size k) of the area k with the size (hereinafter referred to as a size i) of the area i. If the process determines that the size i is smaller than the size k, then in Step S2512, the process increments the counter i and goes back to Step S2502.

Figure 26:
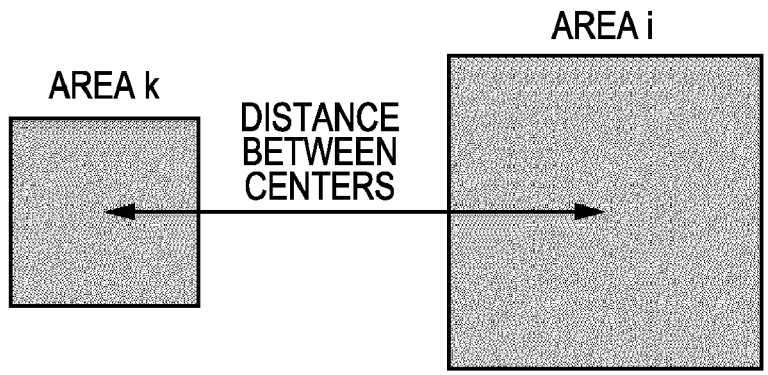
FIG. 26 illustrates a distance between the centers of areas.

If the process determines that size i is larger than or equal to size k (a candidate for a red eye area having a size larger than that of the area k exists), then in Step S2504, the process calculates a distance Size between the centers of both areas, shown in FIG. 26. In Step S2505, the process calculates a threshold value Th_Size used for evaluating the size from the distance Size between the centers of both areas.

Figure 27:
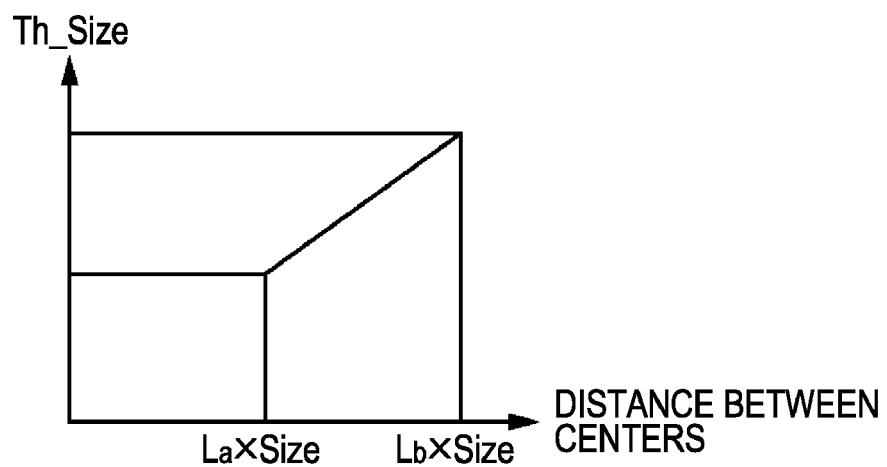
FIG. 27 illustrates an example of the relationship between the distance between the centers of the areas and a threshold value.

FIG. 27 illustrates an example of the relationship between the distance Size between the centers of both areas and the threshold value Th_Size. The horizontal axis represents the distance between the centers of both areas and the vertical axis represents the threshold value Th_Size. "Sa", "Sb", "La", and "Lb" denote parameters and, for example, La=3.0, Lb=5.0, Sa=1.0, and Sb=2.0. If the distance Size between the centers of both areas is equal to a value three or less times larger than the size (the length of the short side) of the area k with these parameters being set, the threshold value Th_Size is equal to 1.0. If the distance Size between the centers of both areas is equal to a value three to five times larger than the size of the area k, the threshold value Th_Size is determined as a value on a straight line shown in FIG. 27. If the distance Size between the centers of both areas is equal to a value five or more times larger than the size of the area k, the determination is not performed.

In Step S2506, the process compares the size i with a size k×Th_Size. If the size i is larger than or equal to the size k×Th_Size, that is, if a candidate for a red eye area larger than area k exists near the area k, the process determines that the area k is not a red eye area and, then in Step S2507, the process excludes the area k from the candidate area list. In Step S2508, the process decrements the total number Ne of detected areas and proceeds to Step S2510.

If the size i is smaller than the size k×Th_Size in Step S2506, then in Step S2509, the process determines whether the size i is equal to a value given by subtracting one from the size k. If the process determines that the size i is smaller than a value given by subtracting one from the size k, then in Step S2512, the process increments the counter i and goes back to Step S2502. If the process determines that the size i is equal to a value given by subtracting one from the size k, then in Step S2510, the process decrements the counter k. In Step S2511, the process determines whether the counter k is equal to zero. If the process determines that the counter k is larger than zero, the process goes back to Step S2500. If the process determines that the counter k is equal to zero, the process is terminated.

The above process allows an unnecessary candidate for a red eye area to be excluded from the candidates for red eye areas recorded in the candidate area list.

As described above, if a candidate for a red eye area smaller than another candidate for a red eye area exists near the other candidate for a red eye area, the smaller candidate for a red eye area is excluded from the candidate area list to resolve the problem about the erroneous determination mentioned above.

Fourth Embodiment

Image processing according to a fourth embodiment of the present invention will be described. The same reference numerals are used in the fourth embodiment to identify approximately the same components as in the first to third embodiments. A detailed description of such components is omitted herein.

Figure 28A:
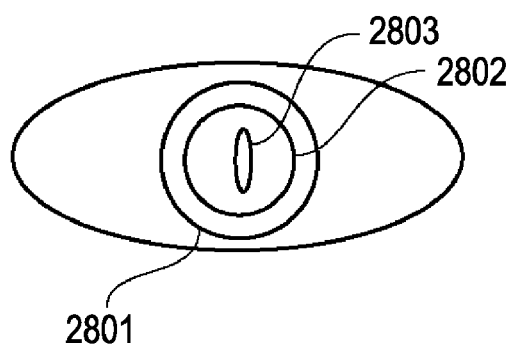
FIGS. 28A and 28B illustrate a challenge in a fourth embodiment of the present invention.

In the adaptive binarization according to the first embodiment of the present invention, there are cases where the red eye area is divided due to a highlight in the red eye. FIG. 28A is an enlarged view of a red eye. Referring to FIG. 28A, reference numeral 2801 denotes the iris area of the eye, reference numeral 2802 denotes the red pupil area thereof, and the reference numeral 2803 denotes a highlight (white) area caused by a flash. Since the red eye effect is a phenomenon caused by a flash, as widely known, the highlight area caused by a flash exists in the pupil area 2802 in an image that is captured with a higher probability. This is also called a catch light.

Figure 28B:
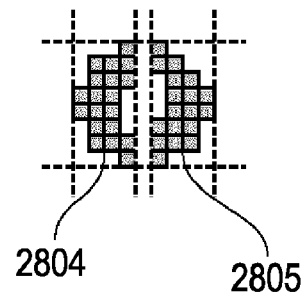

Since the highlight area normally is a minor point in the pupil area in an image that is captured, the highlight area does not have an effect on the detection of a red eye. However, the highlight area can be enlarged so as to occupy a large part of the pupil area or can have a slim shape, like the highlight area 2803 in FIG. 28A, depending on conditions of the image capturing. Applying the adaptive binarization according to the first embodiment to such image data makes the red evaluation amount Er of the highlight area 2803 small and the highlight area 2803 is not determined as the red area. In addition, as shown in FIG. 28B, there are cases where the pupil area is divided into two areas 2804 and 2805 in the binarized image. Applying the downstream steps according to the first embodiment to such two areas greatly reduces the probability of the pupil area 2802 being determined as the red eye area. According to the fourth embodiment of the present invention, a process of combining neighboring red circular areas is provided in order to resolve this problem.

Figure 29:
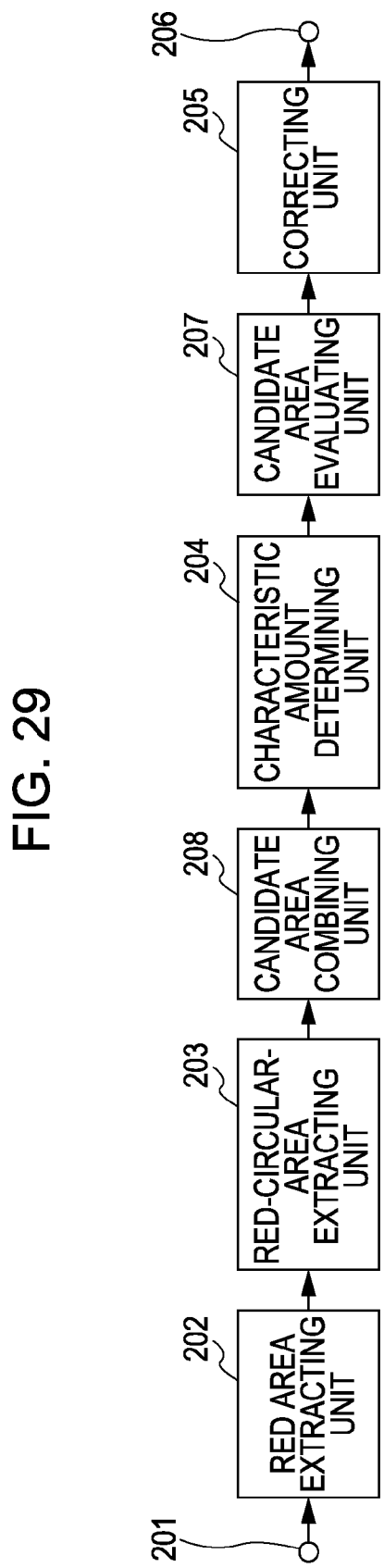
FIG. 29 is a functional block diagram showing the summary of a process of automatically correcting a red eye according to the fourth embodiment of the present invention.

FIG. 29 is a functional block diagram showing the summary of a process of automatically correcting a red eye according to the fourth embodiment of the present invention. The process is performed by the CPU 101. A candidate area combining unit 208 is added to the process shown in FIG. 24, compared with the third embodiment of the present invention.

The candidate area combining unit 208 refers to the candidate area list in which the upper left and lower right coordinates of the red circular area, extracted by the red-circular-area extracting unit 203, are stored to determine whether the red circular area is to be combined with a neighboring red circular area. FIG. 31 shows an example of the candidate area list. Although four red circular areas are recorded in the example in FIG. 31, several tens of, in some cases, several thousands of the red circular areas are practically recorded in the candidate area list.

Figure 30:
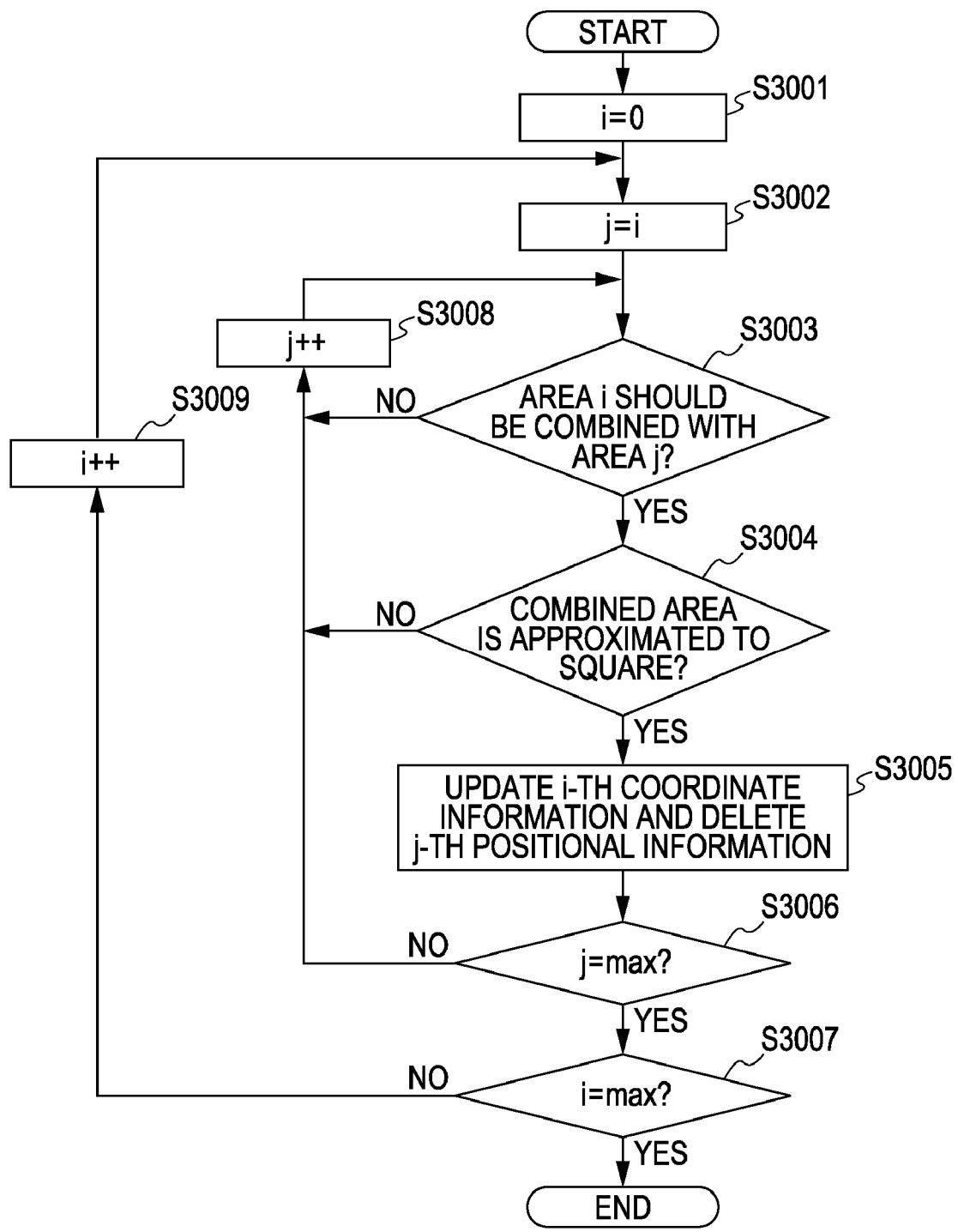
FIG. 30 is a flowchart showing an example of a process performed by a candidate area combining unit.

FIG. 30 is a flowchart showing an example of a process performed by the candidate area combining unit 208.

In Step S3001, the process initializes a counter i to zero. In Step S3002, the process initializes a counter j to "i". In Step S3003, the process determines whether the red circular areas (hereinafter referred to as an "area i" and an "area j") recorded in the i-th row and in the j-th row in the candidate area list, respectively, are to be combined into one. Specifically, as shown in FIG. 32A, the process sets a rectangular area including the area i having a width Wi and a height Hi (the number of pixels) and the area j having a width Wj and a height Hj and calculates the width Wij and height Hij of the rectangular area. Then, the process determines whether the area i is adjacent to the area j and has a size similar to that of the area j, according to Expression (25):

[Formula 25]

$$(Wi \cdot Hi + Wj \cdot Hj)/(Wij \cdot Hij) > Th\_J \quad (25)$$

where "Th_J" denotes a threshold value that is larger than zero and is smaller than or equal to 1.0 ($0 < Th\_J \leq 1.0$).

Expression (25) means that a ratio of the sum of the size of the area i and the size of the area j to the size of the rectangular area including the areas i and j is calculated. If the ratio is larger than the threshold value Th_J, it is determined that the area i is adjacent to the area j and has a size similar to that of the area j. If the areas i and j have the positional relationship shown in FIG. 32B, the ratio calculated according to Expression (25) becomes small and the process determines that the areas i and j are not to be combined into one.

If the process determines in Step S3003 that the areas i and j are not to be combined into one, then in Step S3008, the process increments the counter j and goes back to Step S3003. If the process determines in Step S3003 that the areas i and j are to be combined into one, then in Step S3004, the process determines whether the combined area is approximated to a square, compared with the area before the combination. Specifically, the process determines according to Expression (26):

[Formula 26]

$$\min(Wij,Hij)/\max(Wij,Hij) > \max\{\min(Wi,Hi)/\max(Wi,Hi), \min(Wj,Hj)/\max(Wj,Hj)\} \quad (26)$$

Expression (26) means that the aspect ratio (less than 1.0) of the rectangular area including the areas i and j is larger than the larger aspect ratio among the aspect ratio of the area i and that of the area j. In other words, the process determines whether the rectangular area is approximated to a square. If Expression (26) is satisfied, the combined rectangular area is approximated to a square and, therefore, the red circular area is approximated to a circle.

If Expression (26) is not satisfied, then in Step S3008, the process increments the counter j and goes back to Step S3003. If Expression (26) is satisfied, then in Step 3005, the process updates the i-th positional information in the candidate area list with the coordinate of the rectangular area including the areas i and j and deletes the j-th positional information from the candidate area list.

In Step S3006, the process determines whether the value of the counter j reaches the maximum value (the end of the candidate area list). If the process determines that the value of the counter j does not reach the maximum value, then in Step S3008, the process increments the counter j and goes back to Step S3003. If the process determines that the value of the counter j reaches the maximum value, then in Step S3007, the process determines whether the value of the counter i reaches the maximum value (the end of the candidate area list). If the value of the counter i does not reach the maximum value, then in Step S3009, the process increments the counter i and goes back to Step S3002. If the process determines that the value of the counter i reaches the maximum value, the process is terminated.

The above process allows the red circular areas that are recorded in the candidate area list and that are divided by the highlight area to be combined into one.

As described above, it is determined whether, if a red circular area similar to another red circular area exists adjacent to the other red circular area, combining the red circular areas causes the red circular areas to satisfy the condition of the red eye area (whether the circumscribed rectangular is approximated to a square). With this process, it is possible to appropriately combine the red circular areas corresponding to the red eye area, divided by the highlight area in the pupil area.

Fifth Embodiment

Image processing according to a fifth embodiment of the present invention will be described. The same reference numerals are used in the fifth embodiment to identify approximately the same components as in the first to fourth embodiments. A detailed description of such components is omitted herein.

A method of implementing the image processing according to any of the first to fourth embodiments of the present invention under conditions in which the performance of the CPU and/or the capacity of an available memory (for example, the RAM) is limited will be described in the fifth embodiment of the present invention. The condition corresponds to an image processing unit in an image input-output device, such as a copier, a printer, a digital camera, a scanner, or a digital multifunction machine.

Under the above conditions, the available working memory has a capacity of up to several hundred kilobytes to several megabytes. Meanwhile, the resolution of digital cameras has increased and cameras having a resolution of more than ten million pixels have appeared. In order to detect the red eye area from the images captured at such high definitions by using a limited working memory, reduction in the resolution of input images is an effective approach. For example, subsampling of input images each having eight million pixels every other pixel in the horizontal and vertical directions allows the resolution of the image to be reduced to a quarter of the original resolution, that is, two million pixels. In this case, the capacity of the working memory necessary for storing the images is also reduced to a quarter of the original capacity. However, in the case of pixels each having an RGB value of 24 bits, a working memory of about six megabytes is required to simultaneously hold the reduced images even if the resolution is reduced to the two million pixels. Although this storage capacity can be achieved in a personal computer or a workstation provided with a high-capacity RAM without problems, further improvement is required in limited conditions to reduce the capacity used in the working memory.

Figure 33:
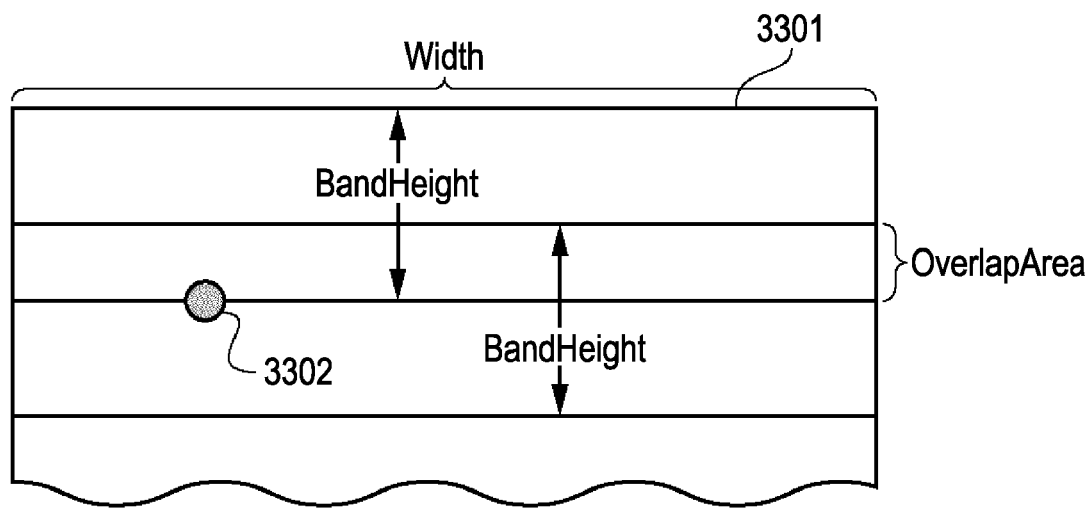
FIG. 33 illustrates band division according to a fifth embodiment of the present invention.

According to the fifth embodiment of the present invention, a method of reducing the size of the input image, dividing the reduced image into bands, and extracting the red eye area for every band will be described. In the division into bands, in order to detect the red eye on the boundary between bands, an overlap area is provided, as shown in FIG. 33. Referring to FIG. 33, reference numeral 3301 denotes a reduced image resulting from reduction of the input image and reference letters "BandHeight" denote the number of lines in one band. In other words, the extraction of the red eye area is performed to images having the number of pixels that is equal to "Width×BandHeight". In the band division in the fifth embodiment, a band is duplicated with the previous band across an area including the number of lines denoted by "OverlapArea". Accordingly, it is possible to extract a red eye 3302 on the boundary between bands.

Figure 34:
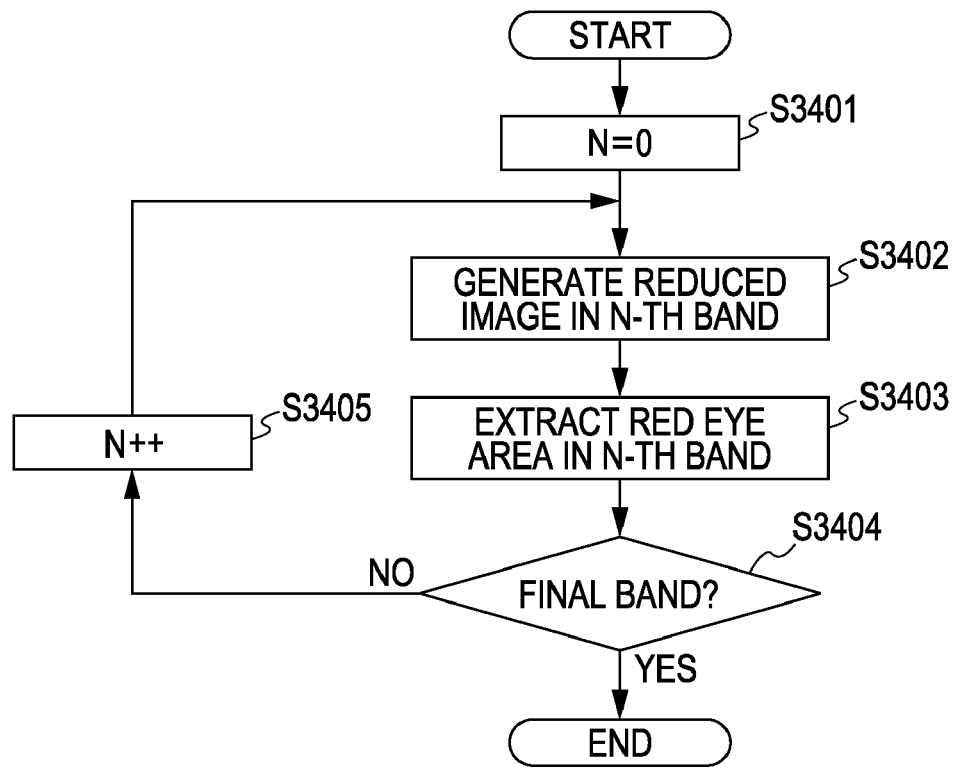
FIG. 34 is a flowchart showing an example of a process of extracting a red eye area according to the fifth embodiment of the present invention.

FIG. 34 is a flowchart showing an example of a process of extracting a red eye area according to the fifth embodiment of the present invention. This process is performed by the CPU in the image input-output device.

In Step S3401, the process initializes a counter N to zero. In Step S3402, the process generates a reduced image in an N-th band.

For simplicity, a method of generating the reduced image by simple decimation will be described. For example, it is presumed that images each having eight million pixels are stored in a memory (such as a flash memory or a hard disk mounted in the device or a memory card externally loaded in the device) of the image input-output device.

In Step S3402, the process accesses image data in the memory and, if the image data is stored in a Joint Photographic Experts Group (JPEG) format, decodes a first minimum coding unit (MCU) block to store the decoded block in a predetermined area in the working memory. This MCU block has a size of, for example, 16×8 pixels. Then, the process performs the subsampling of the decoded image data, for example, every other pixel to generate image data having a size of 8×4 pixels, and stores the generated image data in an image storage area for the extraction of the red eye area in the working memory. The process repeats this processing until the image storage area for the extraction of the red eye area, corresponding to the number "BandHeight" of lines, becomes full. The above step provides a band image used when the eight million pixels in the image are reduced to the two million pixels.

The reduced image may be generated by any of various methods including neighbor interpolation and linear reduction, as an alternative to the simple decimation.

After the band image of the reduced image is generated, then in Step S3403, the process extracts the red eye area in the N-th band.

Figure 35:
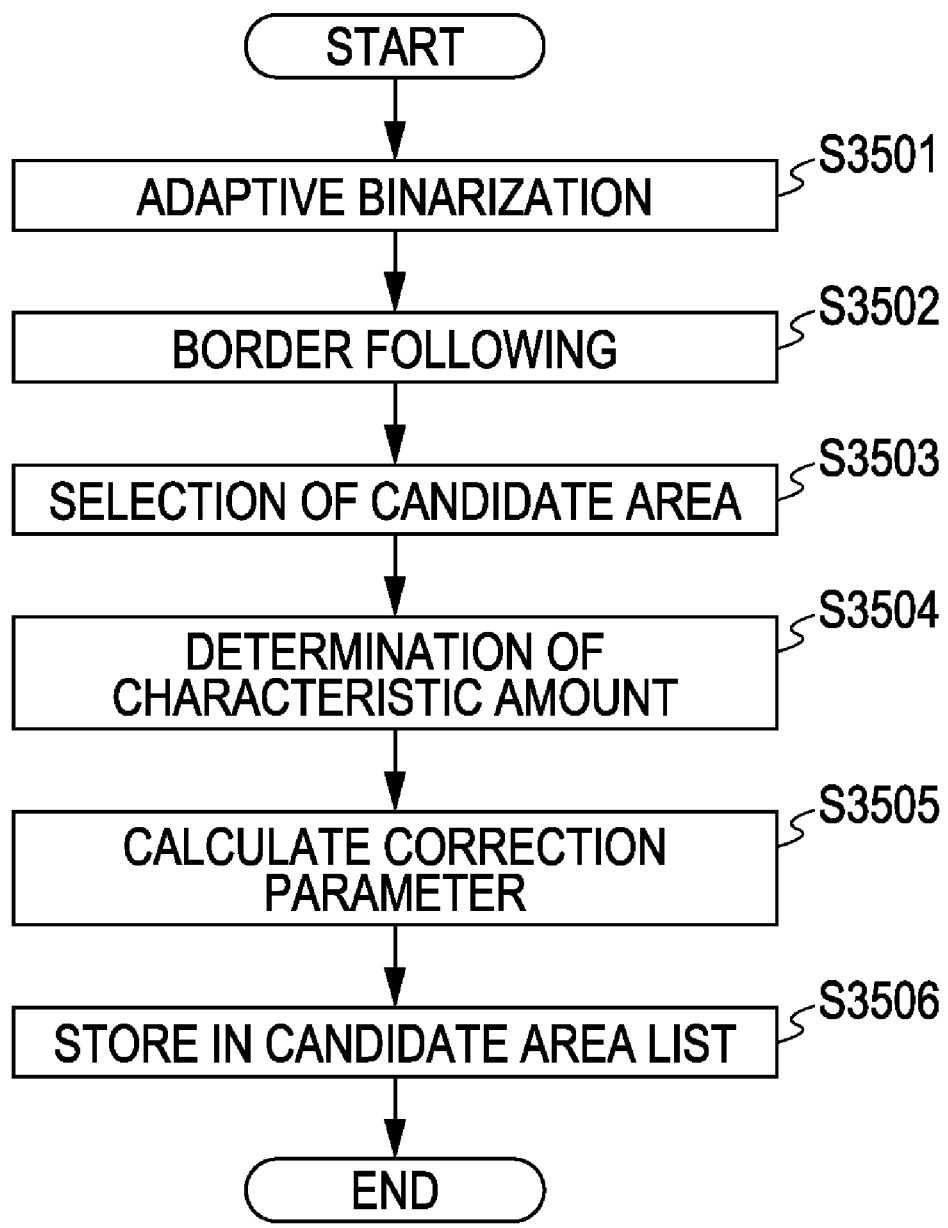
FIG. 35 is a flowchart showing extraction of the red eye area in the N-th band in detail.

FIG. 35 is a flowchart showing the extraction of the red eye area in the N-th band (Step S3403) in detail.

In Step S3501, the process performs the adaptive binarization, described above, to the reduced image. The binarization result (the binarized image of the red area) is stored in an area different from the storage area for he reduced image. Since the OverlapArea area in the reduced image is a duplicated area, the processing of the OverlapArea area is finished in the N−1-th band. Accordingly, if N>0, the processing of the OverlapArea area may be skipped to reuse the result in the N−1-th band. This contributes to increase in the processing speed.

In Step S3502, the process performs the border following, described above, to the binarization result (the red area) to extract the red circular area from the band image.

Before performing the determination of the characteristic amounts to the extracted red circular area, in Step S3503, the process performs selection of a candidate area to select a red circular area to which the determination of the characteristic amounts is to be performed from the multiple red circular areas.

Figure 36:
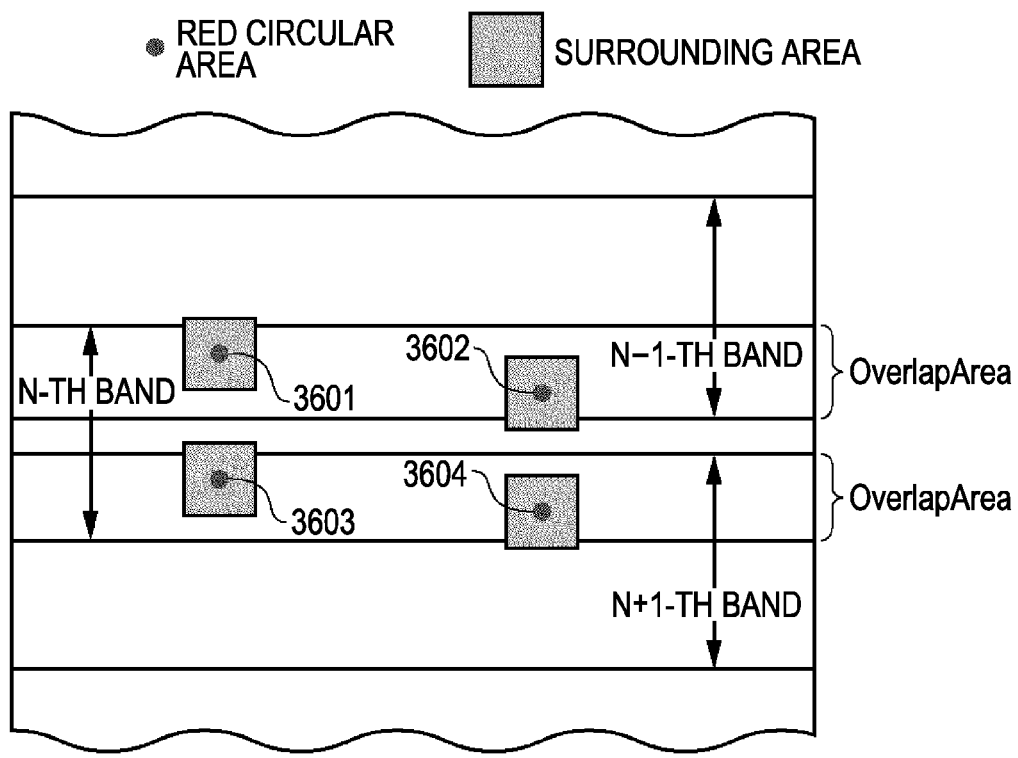
FIG. 36 shows an example in which four red circular areas exist in the overlap areas across the N−1-th, N-th, and N+1-th bands.

FIG. 36 shows an example in which four red circular areas exist in the OverlapArea areas across the N−1-th, N-th, and N+1-th bands. For example, a red circular area 3603 exists across the N-th and N+1-th bands. It is not efficient to perform the determination of the characteristic amounts in the N-th and N+1-th bands because the processing in the red circular area 3603 in the OverlapArea area is duplicated.

Accordingly, it is determined which band, between the N-th and N+1-th bands, the determination of the characteristic amounts of the red circular area 3603 is to be performed in. Upper part of the surrounding area set for the red circular area 3603 cannot be referred to in the determination in the N+1-th band, whereas the surrounding area can be referred to in the determination in the N-th band. Hence, the determination result in the N-th band has a higher reliability for the red circular area 3603. Generally, the determination of the characteristic amounts of the red circular area in the OverlapArea area should be performed in a band in which a wider portion in the surrounding area of the red circular area can be referred to.

Figure 37:
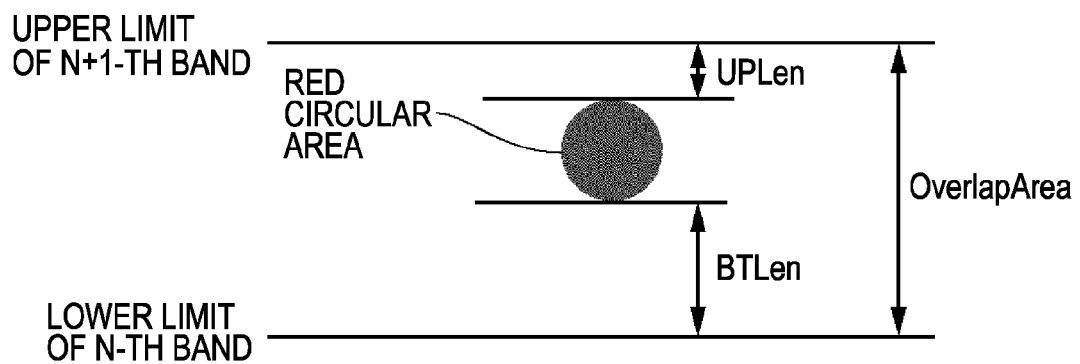
FIG. 37 illustrates how to select a candidate area.

Consequently, in the selection of a candidate area in Step S3503 in the fifth embodiment, as shown in FIG. 37, a distance UPLen between the upper end of the red circular area in the OverlapArea area and the upper end of the N+1-the band is estimated (the position of the red circular area in the N+1-th band is estimated because the N+1-th band has not been processed yet) to calculate a distance BTLen between the lower end of the red circular area and the lower end of the N-th band. If UPLen<BTLen, the determination of the characteristic amounts of the red circular area is performed in the N-th band. If UPLen≧BTLen, the determination of the characteristic amounts of the red circular area is not performed in the N-th band (performed in the N+1-th band). When the determination of the characteristic amounts is not performed in the N-th band, the red circular area is excluded from the candidate area list.

When the distances UPLen and BTLen are calculated for a red circular area 3604 in FIG. 36, the relationship between the distances UPLen and BTLen is expressed as UPLen>BTLen, so that the determination of the characteristic amounts of the red circular area 3604 is performed in the N+1-th band. As for red circular areas 3601 and 3602, the determinations of the characteristic amounts of the red circular areas 3601 and 3602 are performed in the N−1-th band and the N-th band, respectively.

As described above, in the selection of a candidate area in Step S3503, the distances (margin) between the upper end of the red circular area in the OverlapArea area and the upper end of the N+1-th band and between the lower end thereof and the lower end of the N-th band are calculated to determine which band the determination of the characteristic amounts is performed in, depending on the relationship between the distances. This method prevents the determination of the characteristic amounts of the red circular area in the OverlapArea area from being duplicated.

Referring back to FIG. 35, in Step S3504, the process performs the determination of the characteristic amounts, described above, to the red circular area selected in Step S3503. In Step S3505, the process calculates parameters necessary for the correction of the area determined as the red eye area. In Step S3506, the process stores a combination of information concerning the red eye area and the parameters in the candidate area list, as shown in FIG. 38. The parameters are the maximum luminance Ymax of the correction area and the maximum value Ermax in the red evaluation amounts, necessary for the calculation (Equation (23)) of the correction amounts Vy and Vc.

Referring back to FIG. 34, after the extraction of the red eye area in the N-th band in FIG. 35 is finished in Step S3403, then in Step S3404, the process determines whether the processing of the final band is completed. If the processing of the final band is completed, the process is terminated. If the processing of the final band is not completed, then in Step S3405, the process increments the counter N and goes back to Step S3402.

Figure 39:
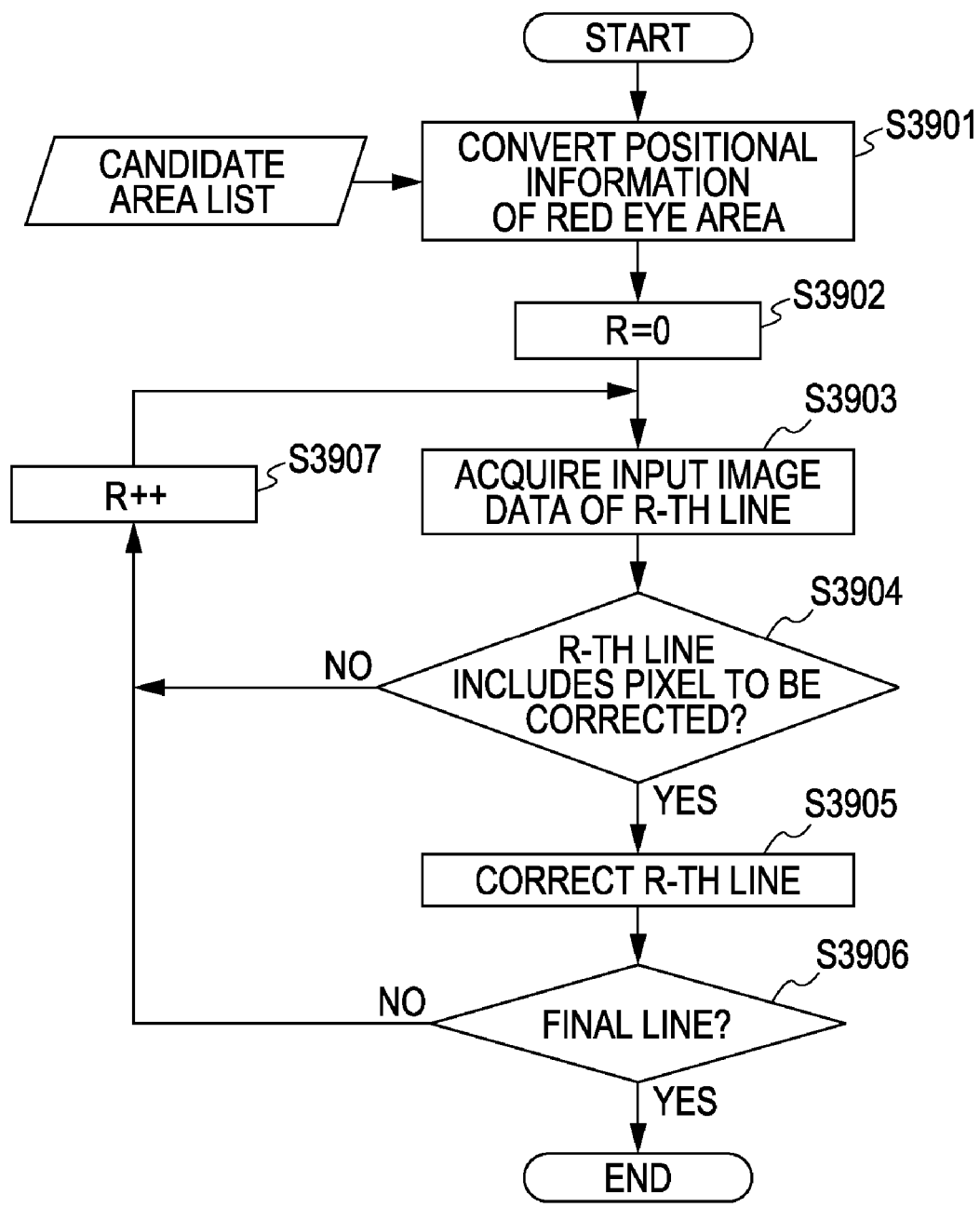
FIG. 39 is a flowchart showing an example of a correction process according to the fifth embodiment of the present invention.

FIG. 39 is a flowchart showing an example of a correction process according to the fifth embodiment of the present invention.

In Step S3901, the process converts the positional information of the red eye area. Since the extraction of the red eye area and the correction are performed as processes incorporated in the image input-output device in the fifth embodiment, the extraction of the red eye area is performed to the reduced image, as described above. However, the image to be corrected is a high-resolution image before the reduction and the image can be enlarged to a print (output) resolution or can be rotated if the image input-output device, such as a printer, is used. Accordingly, it is necessary to convert the positional information of the red eye area, extracted from the reduced image, in accordance with the reduction ratio, magnification, or the rotation.

Figure 41:
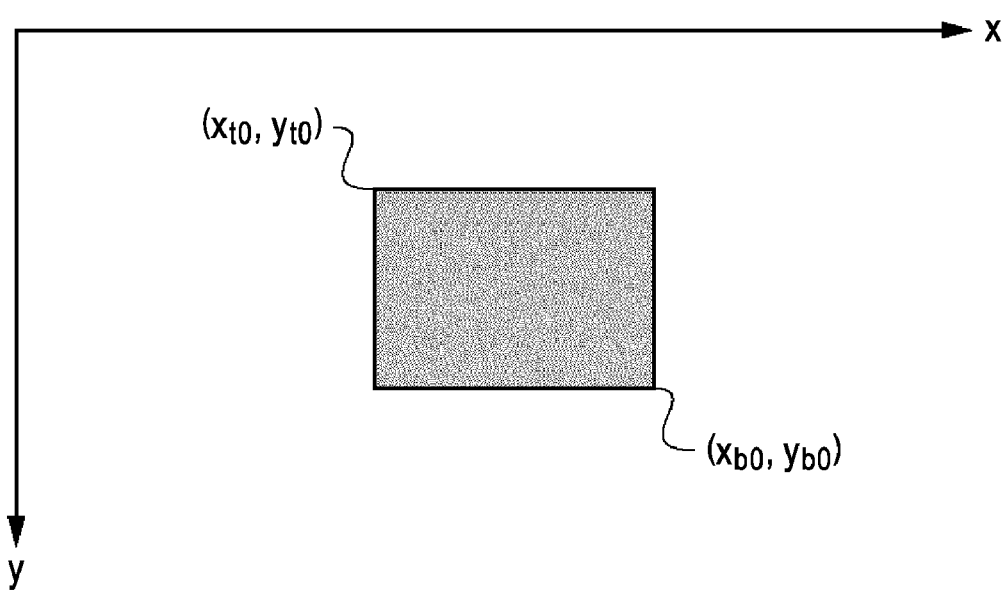
FIG. 41 illustrates positional information concerning the red eye area, stored in the candidate area list.

The positional information stored in the candidate area list is represented with the upper left coordinate $(x_{t0}, y_{t0})$ and the lower right coordinate $(x_{b0}, y_{b0})$ of the red eye area, as shown in FIG. 41. When the numbers of horizontal and vertical pixels of the reduced image are denoted by "W0" and "H0" and the numbers of horizontal and vertical pixels of the image to be corrected are denoted by "W1" and "H1", the coordinate of the red eye area in the image to be corrected is calculated according to Equation (27):

[Formula 27]

$$(x_{t1}, y_{t1}) = \{\text{int}(x_{t0} \cdot k), \text{int}(y_{t0} \cdot k)\}(x_{b1}, y_{b1}) = \{\text{int}(x_{b0} \cdot k), \text{int}(y_{b0} \cdot k)\} \quad (27)$$

where k=W1/W0, "int( )" denotes a maximum integer that does not exceed the value of the argument, "$(x_{t1}, y_{t1})$" denotes the upper left coordinate of the red eye area in the image to be corrected, and "$(x_{b1}, y_{b1})$" denotes the lower right coordinate of the red eye area in the image to be corrected.

After the coordinate of the red eye area in the image to be corrected is determined in Step S3901, an elliptical area is set around the red eye area, in the same manner as in the first embodiment, and the following steps are performed by using a pixel in the elliptical area as the pixel to be corrected.

In Step S3902, the process initializes a counter R to zero. In Step S3903, the process acquires image data in the R-th line in the image to be corrected. Although the image to be corrected is corrected in units of lines in the fifth embodiment, the correction is not limited to this method. The image may be corrected in units of bands across a predetermined number of lines. The extraction of the image data to be corrected is realized by decompressing the image, stored in a compression format, such as the JPEG format, in the storage device 105 in FIG. 1 or a memory card, of an amount corresponding to the predetermined number of lines and acquiring the image data in one line (or multiple lines) from the decompressed image data.

In Step S3904, the process determines whether the R-th line includes a pixel to be corrected. In the correction according to the fifth embodiment, the elliptical area set around the red eye area (rectangular area) is used as the area to be corrected. Accordingly, the process determines whether the R-th line is located between the upper end of the area to be corrected and the lower end thereof, for all the red eye areas stored in the candidate area list. If the process determines that the R-th line does not include the pixel to be corrected, then in Step S3907, the process increments the counter R and goes back to Step S3903.

Figure 40:
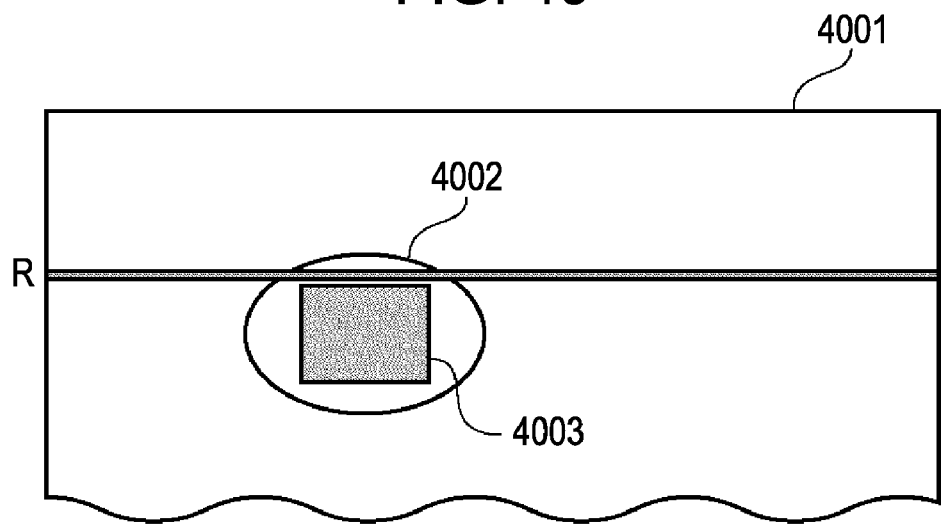
FIG. 40 shows an example of the relationship between a correction line and an area to be corrected.

For example, in an example shown in FIG. 40, the R-th line is included in an area 4002 to be corrected set around a red eye area 4003. Accordingly, if the process determines in Step S3904 that the R-the line includes the pixel to be corrected, then in Step S3905, the process applies the correction according to the first embodiment to the pixels in the area 4002 to be corrected on the R-th line. The parameters calculated in Step S3505 and stored in the candidate area list in Step S3506 are used as the maximum luminance Ymax and the maximum value Ermax in the red evaluation amounts, necessary for the correction.

In Step S3906, the process determines whether the R-th line is the final line. The process repeats the above steps until the R-th line reaches the final line to perform the correction to the entire input image.

The corrected image data may be stored in, for example, the storage device 105. Alternatively, the corrected image data may be printed on a recording sheet of paper with, for example, the printer 110 after the image data is subjected to color conversion and pseudo-tone processing.

As described above, the extraction and correction of the red eye area, as the ones described in the first to fourth embodiments, can be realized in a condition using a memory resource with a much lower capacity, by reducing the input image and dividing the reduced image into bands to extract the red eye area in units of bands. In addition, performing a band division such that an overlap area exists across adjacent bands allows the red eye area on the boundary between the bands to be extracted.

A red-eye-area extracting unit may be mounted in an image input device, such as an imaging device, and a red-eye-area correcting unit may be mounted in an image output device, such as a printing device.

Modifications

Although the red evaluation amount Er that does not use the B component in the RGB components is defined for every pixel in the above embodiments of the present invention, the red evaluation amount Er is not limited to this. For example, defining the red evaluation amount Er according to Equation (28) and setting a coefficient k to zero or to a value smaller than coefficients i and j also provide a similar effect.

[Formula 28]

$$Er = (i \cdot R + j \cdot G + k \cdot B)/R \quad (28)$$

where the coefficients i, j, and k denote weights, which may be negative values.

In addition, after the pixel value is converted into a value in another color space, such as Lab or YCbCr, the red evaluation amount Er may be defined with the blue component being excluded or with the blue component having a smaller weight.

Other Embodiments

The present invention is applicable to a system including multiple apparatuses (for example, a host computer, an interface device, a reader, and a printer) or to an apparatus including only one device (for example, a copier or a facsimile device).

The present invention can be embodied by supplying a storage medium (or a recording medium) having the program code of software realizing the functions according to the above embodiments to a system or an apparatus, the computer (or the CPU or the micro processing unit (MPU)) in which system or apparatus reads out and executes the program code stored in the storage medium. In this case, the program code itself read out from the storage medium realizes the functions of the embodiments described above. The present invention is applicable to the storage medium having the program code stored therein. The computer that executes the readout program code realizes the functions of the embodiments described above. In addition, the operating system (OS) or the like running on the computer may execute all or part of the actual processing based on instructions in the program code to realize the functions of the embodiments described above.

Alternatively, after the program code read out from the storage medium has been written in a memory that is provided in an expansion board included in the computer or in an expansion unit connected to the computer, the CPU or the like in the expansion board or the expansion unit may execute all or part of the actual processing based on instructions in the program code to realize the functions of the embodiments described above.

When the present invention is applied to the above storage medium, the program code corresponding to the flowcharts described above is stored in the storage medium.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2005-174251 filed Jun. 14, 2005, which is hereby incorporated by reference herein in its entirety.

What is claimed is:

1. An image processing apparatus comprising:
a calculating unit configured to calculate an evaluation amount of red eye for every pixel satisfying a predetermined condition in an image;
an extracting unit configured to extract a candidate pixel having red eye including a pupil on the basis of the evaluation amount; and
one or more processors programmed to control at least one of the calculating unit and extracting unit,
wherein the evaluation amount is calculated from only red and green components of the pixel in the image and without a blue component of the pixel in the image.

2. An image processing method comprising the steps of:
calculating an evaluation amount of red eye for every pixel satisfying a predetermined condition in an image; and
extracting a candidate pixel having red eye including a pupil on the basis of the evaluation amount,
wherein the evaluation amount is calculated from only red and green components of the pixel in the image and without a blue component of the pixel in the image.

3. An image processing apparatus comprising:
a calculating unit configured to calculate an evaluation amount of red eye on the basis of a predetermined color component for every pixel satisfying a predetermined condition in an image;
a pixel extracting unit configured to extract a candidate pixel in the image area having red eye including a pupil on the basis of the evaluation amount;
an area extracting unit configured to extract a candidate area having a predetermined shape, including the candidate pixel;
a determining unit configured to determine whether the candidate area is used as a correction area on the basis of a characteristic amount of the eye, calculated from the candidate area; and
one or more processors programmed to control at least one of the calculating unit, the pixel extracting unit, the area extracting unit and the determining unit,
wherein the evaluation amount is calculated from only red and green components of the pixel in the image and without a blue component of the pixel in the image.

4. The image processing apparatus according to claim 1, wherein the evaluation amount is calculated by (R-G)/R from red and green components of the pixel in the image.

5. The image processing apparatus according to claim 3, wherein the evaluation amount is calculated by (R-G)/R from red and green components of the pixel in the image.

6. The image processing apparatus according to claim 1, further comprising:
an area extracting unit configured to extract an area having a plurality of candidate pixels extracted by the extracting unit, determine whether the extracted area has a predetermined shape, and extract an area, having been determined to have the predetermined shape, as a red-eye candidate area.

7. The image processing apparatus according to claim 1, wherein the extracting unit sets a predetermined window area near a target pixel in the image, determines a threshold value from the evaluation amount of a pixel in the window area, and binarizes the evaluation amount of the target pixel by the use of the threshold value to extract the candidate pixel.

8. The image processing apparatus according to claim 7, wherein the extracting unit sets the window area corresponding to multiple pixels on a line of the target pixel.

9. The image processing apparatus according to claim 7, wherein, after scanning the target pixel in a direction on a line to extract the candidate pixel, the extracting unit scans the target pixel in the opposite direction on the line to extract the candidate pixel and uses the pixel extracted in both the two scannings as the candidate pixel.

10. The image processing apparatus according to claim 6, wherein the area, having the predetermined shape, is an area that has a shape approximated to a circle or an ellipse.

11. The image processing apparatus according to claim 6, further comprising:
a determining unit configured to determine whether the candidate area is used as a correction area on the basis of a characteristic amount of an eye, calculated from the candidate area, and
a correcting unit configured to perform red-eye correction process on the correction area in a case where the determining unit determines to use the candidate area as the correction area.

12. The image processing apparatus according to claim 3, further comprising an area excluding unit configured to exclude any candidate area that is smaller than the candidate area and that is adjacent to the candidate area.

13. The image processing apparatus according to claim 3, further comprising an area combining unit configured to combine another candidate area adjacent to the candidate area with the candidate area.

14. The image processing apparatus according to claim 13, wherein, if an area including the combination of the two candidate areas has a shape approximated to a square, compared with the two candidate areas, the area combining unit combines the two candidate areas into one.

15. The image processing apparatus according to claim 3, further comprising a correcting unit configured to correct the poor color tone in the correction area.

16. The image processing apparatus according to claim 15, wherein the correcting unit includes:
a first calculator for calculating a first weight in accordance with a distance between a pixel in the correction area and the center of the correction area;
a second calculator for calculating a second weight in accordance with a ratio of the evaluation amount of a target pixel to a maximum value in the evaluation amounts of the pixels in the correction area;
a third calculator for calculating a third weight in accordance with a ratio of a luminance of the target pixel to a maximum value in the luminances of the pixels in the correction area;
a determiner for determining correction amounts of luminance and color difference components by using the first to third weights; and
a corrector for correcting the luminance and color difference components of the target pixel by using the correction amounts.

17. The image processing apparatus according to claim 16, wherein the determiner determines the correction amount of the luminance component by using the first to third weights and determines the correction amount of the color difference component by using the first and second weights.

18. An image processing method comprising the steps of:
calculating an evaluation amount of red eye on the basis of a predetermined color component for every pixel satisfying a predetermined condition in an image;
extracting a candidate pixel in the image area having red eye including a pupil on the basis of the evaluation amount;
extracting a candidate area having a predetermined shape, including the candidate pixel; and
determining whether the candidate area is used as a correction area on the basis of a characteristic amount of the eye, calculated from the candidate area,
wherein the evaluation amount is calculated from only red and green components of the pixel in the image and without a blue component of the pixel in the image.

19. A non-transitory computer readable recording medium having a program for controlling an image processing apparatus so as to realize the image processing method according to claim 2 recorded therein.

20. The image processing apparatus according to claim 3, wherein the evaluation amount is calculated by (R-G) or R/G from red and green components of the pixel in the image.

21. The image processing method according to claim 2, wherein the evaluation amount is calculated by (R-G)/R of a pixel having a red component that is larger than a green component in the image.

22. The image processing apparatus according to claim 1, wherein the evaluation amount is calculated by (R-G) or R/G from red and green components of the pixel in the image.

* * * * *